(12) United States Patent
Yamagajo et al.

(10) Patent No.: US 7,089,130 B2
(45) Date of Patent: Aug. 8, 2006

(54) ELECTRIC/MAGNETIC FIELD ANALYSIS METHOD USING FINITE DIFFERENCE TIME DOMAIN, MATERIAL DESCRIPTIVE METHOD IN ELECTRIC/MAGNETIC ANALYSIS, ELECTRIC/MAGNETIC ANALYSIS DEVICE, ANALYSIS DATA GENERATION DEVICE AND STORAGE MEDIUM

(75) Inventors: Takashi Yamagajo, Kawasaki (JP); Takefumi Namiki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 67 days.

(21) Appl. No.: 10/923,709

(22) Filed: Aug. 24, 2004

(65) Prior Publication Data

US 2005/0187723 A1    Aug. 25, 2005

(30) Foreign Application Priority Data

Feb. 24, 2004    (JP) .............................. 2004-047965

(51) Int. Cl.
*G06F 19/00*    (2006.01)

(52) U.S. Cl. ............................. 702/65; 702/38; 702/66; 702/64; 702/57; 324/260; 324/200

(58) Field of Classification Search .................. 702/66, 702/64, 127, 65, 67, 57, 38; 703/4, 13; 324/260, 324/546, 200, 545, 244

See application file for complete search history.

(56) References Cited

U.S. PATENT DOCUMENTS 6,226,599 B1    5/2001    Namiki
6,319,629 B1    11/2001   de M. Ferreira
6,507,795 B1 *  1/2003    Namiki ........................ 702/66

FOREIGN PATENT DOCUMENTS

| JP | 10-307160 | 11/1998 |
| JP | 10-307161 | 11/1998 |
| JP | 11-15363  | 6/1999  |
| JP | 11-352166 | 12/1999 |
| JP | 2000-227470 | 8/2000 |
| JP | 2002-340954 | 11/2002 |

OTHER PUBLICATIONS

K.H. Dridi et al., "Staircase Free Finite-Difference Time-Domain formulation for General Materials in Complex geometries", IEEE Transactions of Antennas and Propagation, 2001, vol. 49, No. 5, pp. 749 (Abstract).

* cited by examiner

*Primary Examiner*—John Barlow
*Assistant Examiner*—Hien Vo
(74) *Attorney, Agent, or Firm*—Staas & Halsey LLP

(57) ABSTRACT

Two centerlines each of which goes through the center of a surface and is parallel to one of the coordinate axes are considered for each surface constituting a cell. If one of the centerlines intersects a boundary, a line which goes through the intersection and is orthogonal to the centerline is approximated as a new boundary. If a boundary intersects with each of the two centerlines, an orthogonal line expressed by each of two lines which is obtained by crossing each of the two centerlines parallel to each different coordinate axis and a boundary is approximated as a new boundary. Thus, the new boundary is expressed by each part of these orthogonal lines toward the centerline from their intersection.

13 Claims, 23 Drawing Sheets

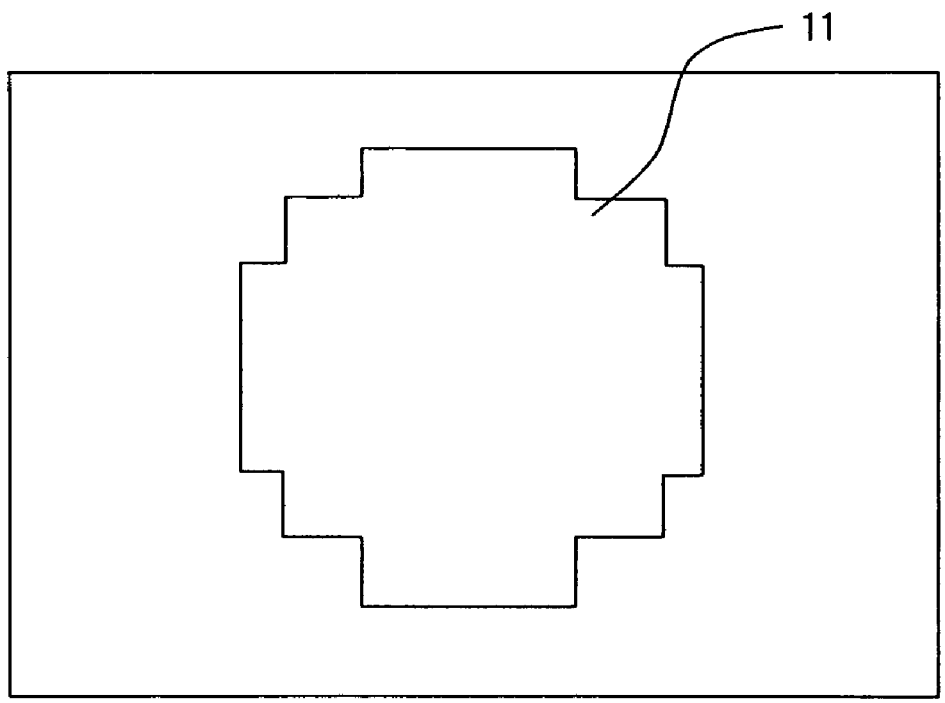
F I G. 2

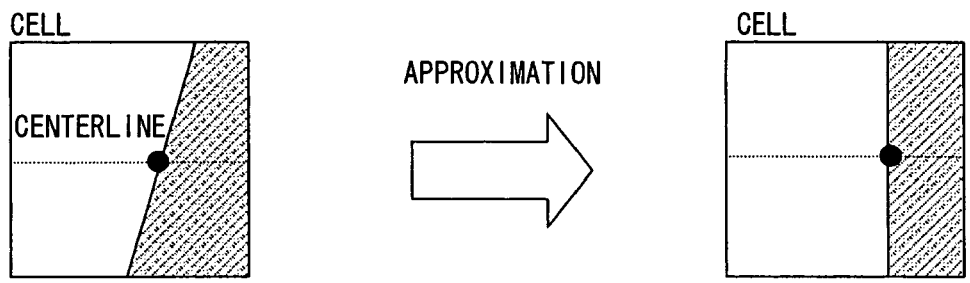
F I G. 3A
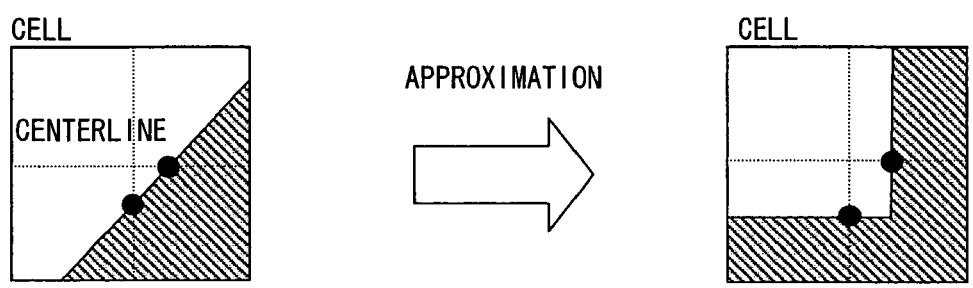
F I G. 3B
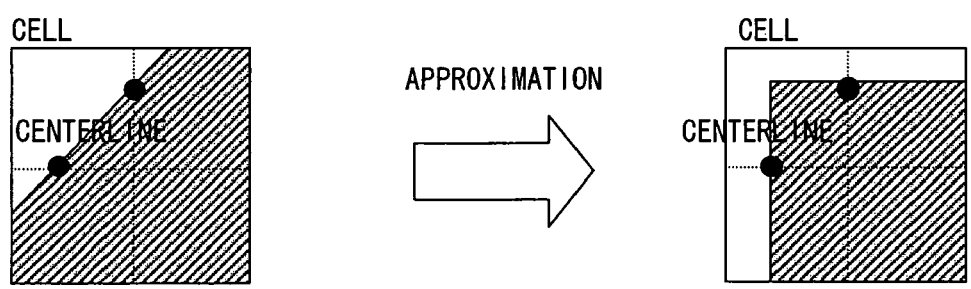
F I G. 3C

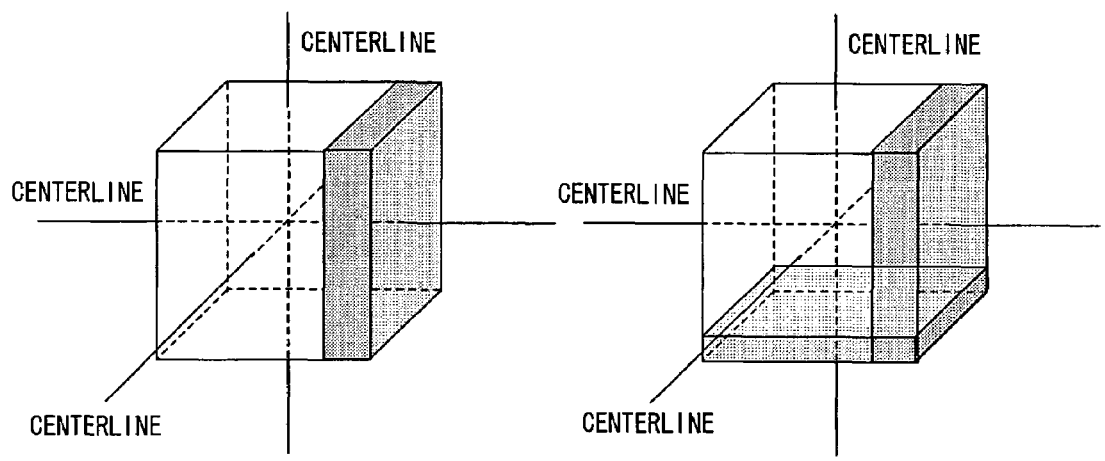
F I G. 4A    F I G. 4B
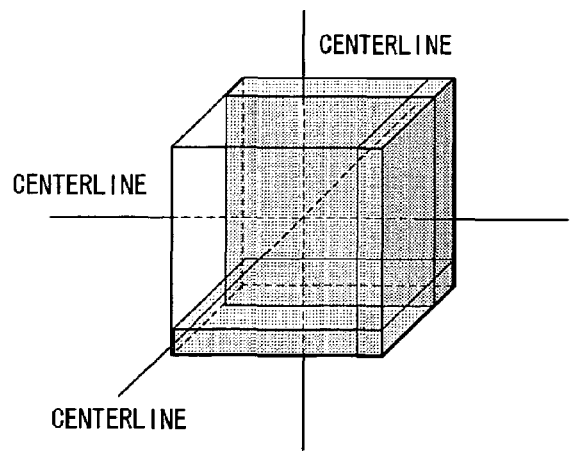
F I G. 4C

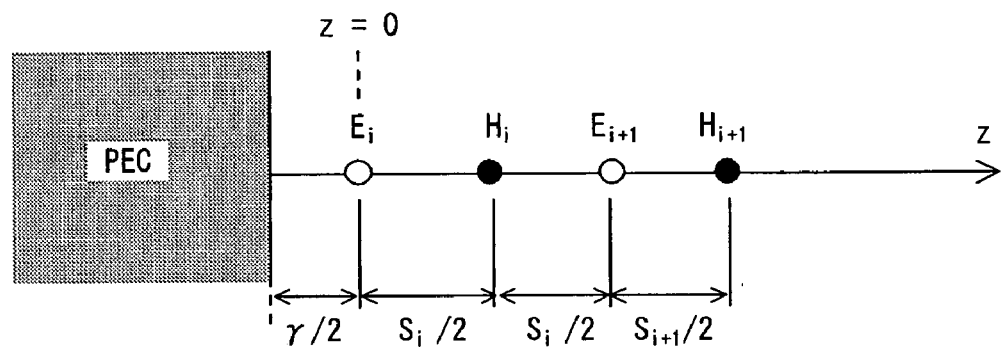
F I G. 5

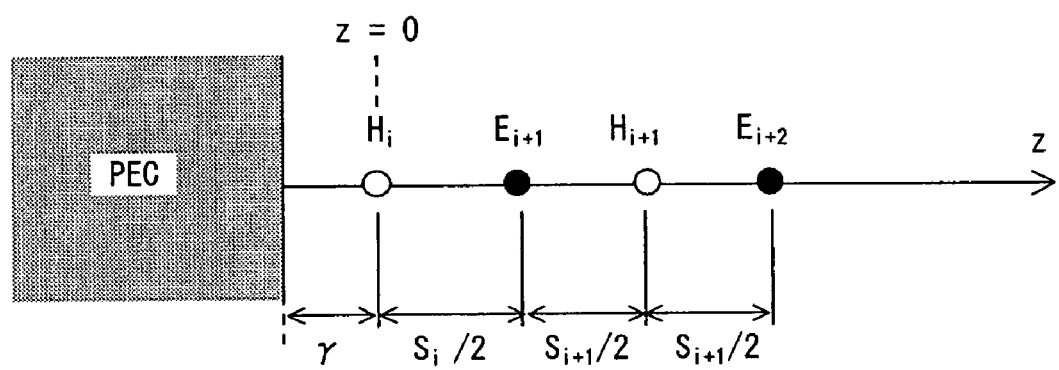
F I G. 6

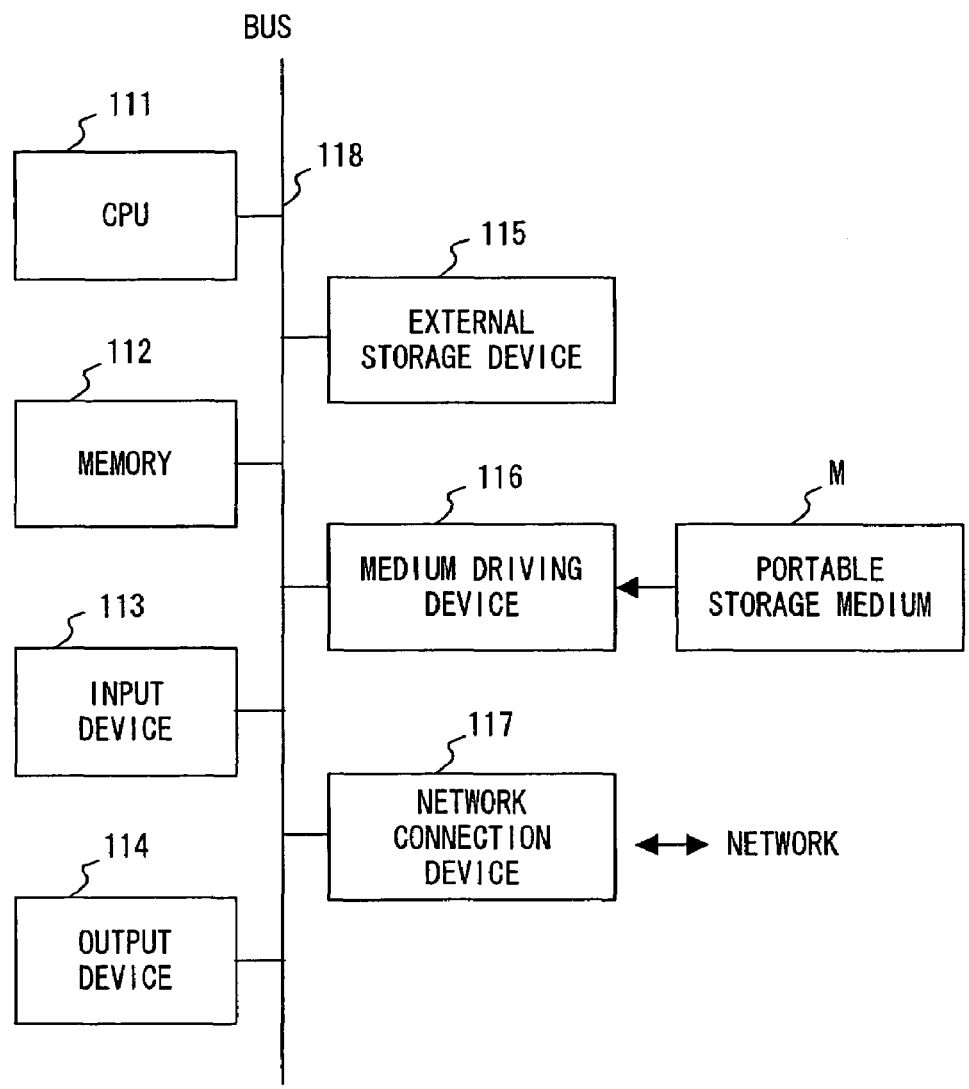
F I G. 1 1

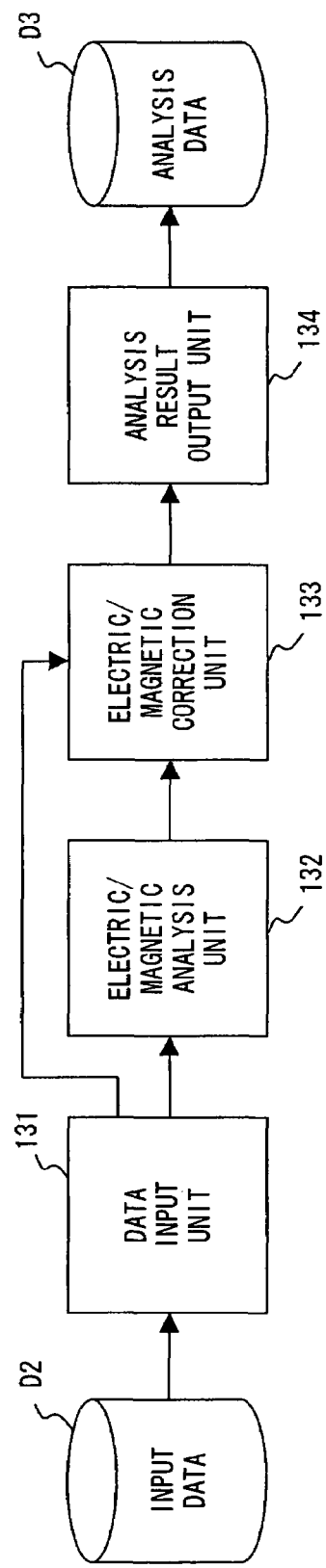
F I G. 1 3

\*\*\* INTERSECTION \*\*\*

| | | |
|---|---|---|
| 2 | | |
| 0 | | |
| 2 | | |
| 0 | | |
| 0 | | |
| 0 | | |
| 10 | 10 | 3 |
| 1 | 2 | |
| 1.0e-5 | | |
| 10 | 10 | 4 |
| 1.0e-5 | | |
| 10 | 10 | 3 |
| 1 | 2 | |
| 0.8e-5 | | |
| 10 | 11 | 3 |
| 1 | 2 | |
| 1.2e-5 | | |

F I G. 1 5

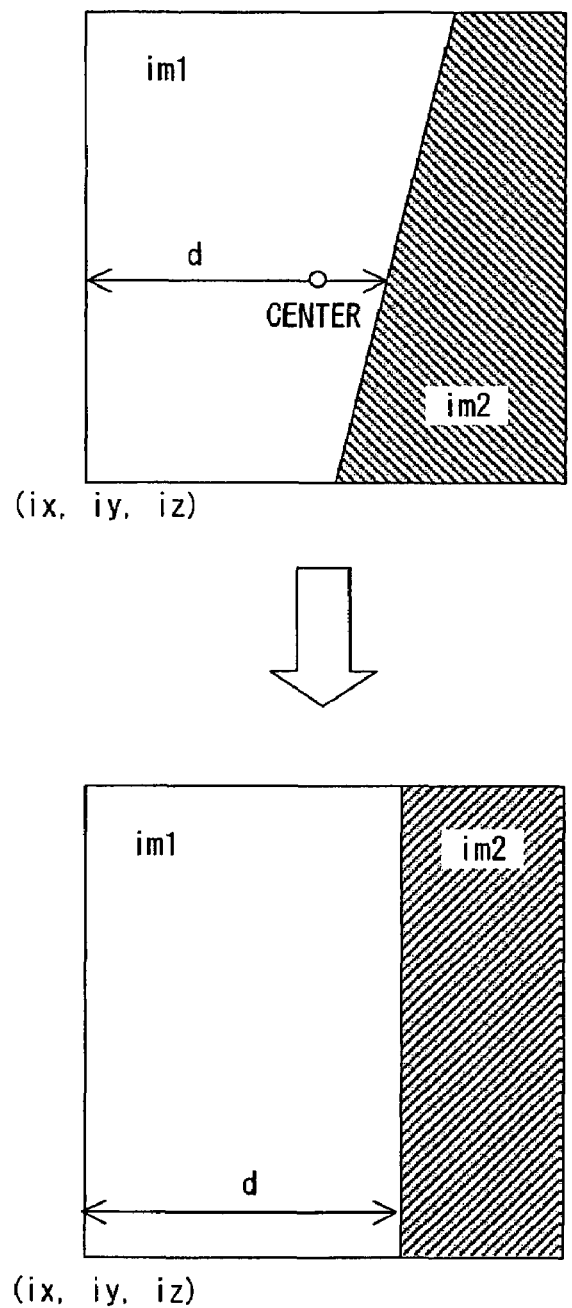
F I G. 1 6

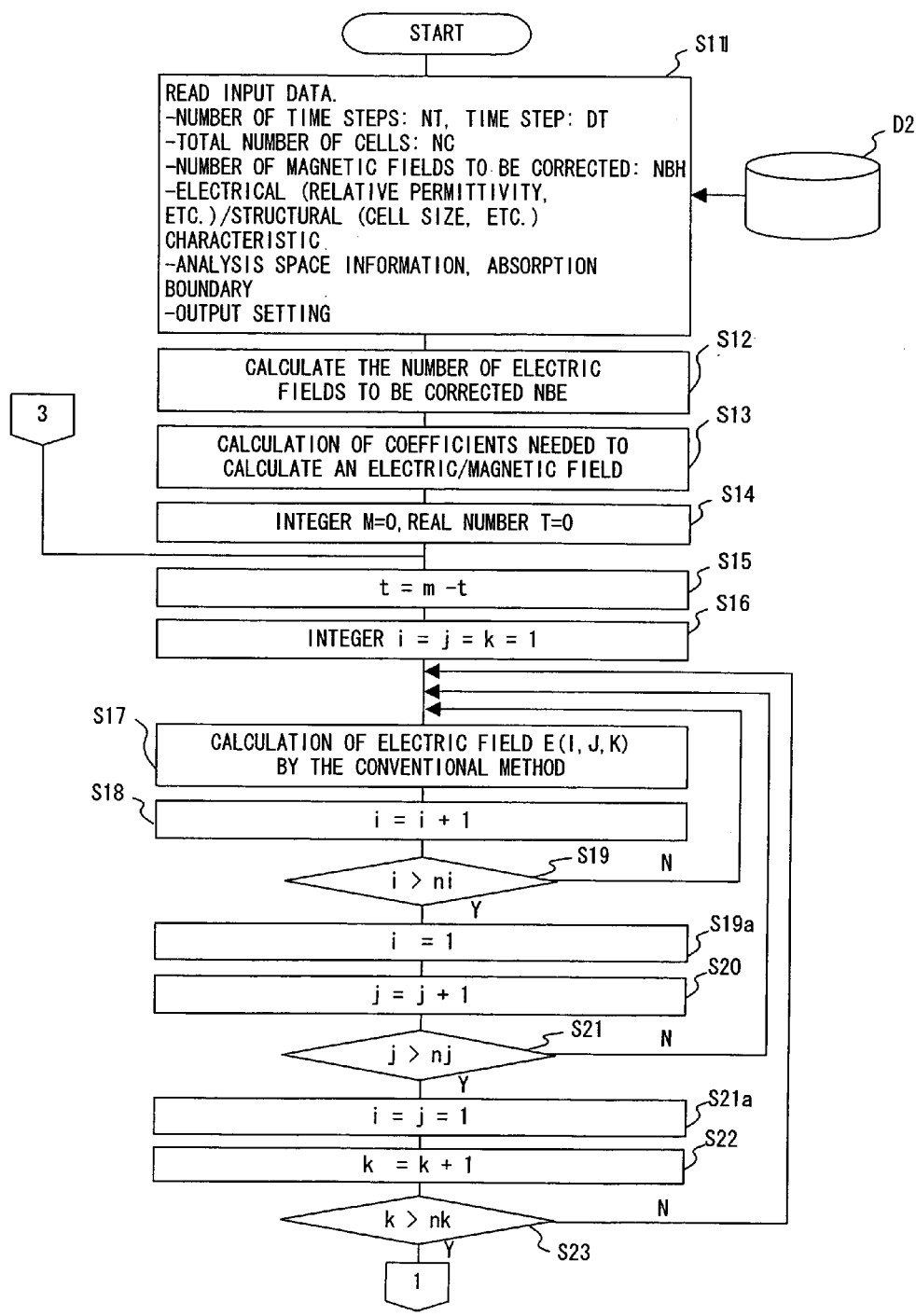
F I G. 1 8

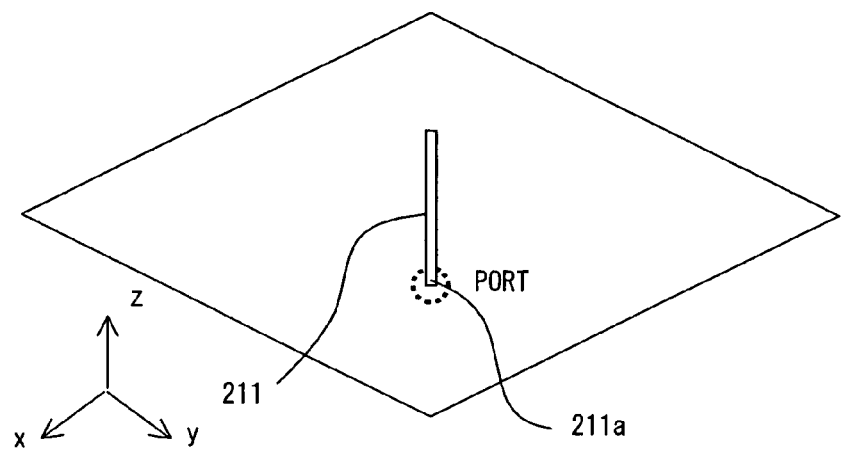
F I G. 2 1 A
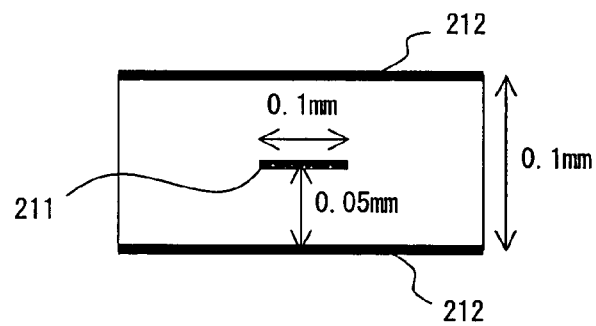
F I G. 2 1 B
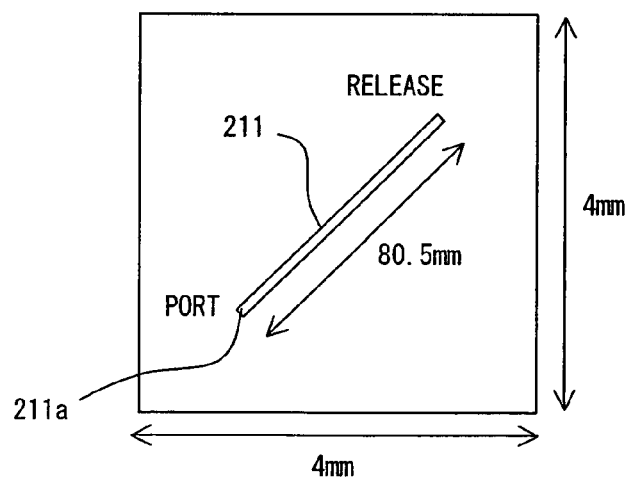
F I G. 2 1 C

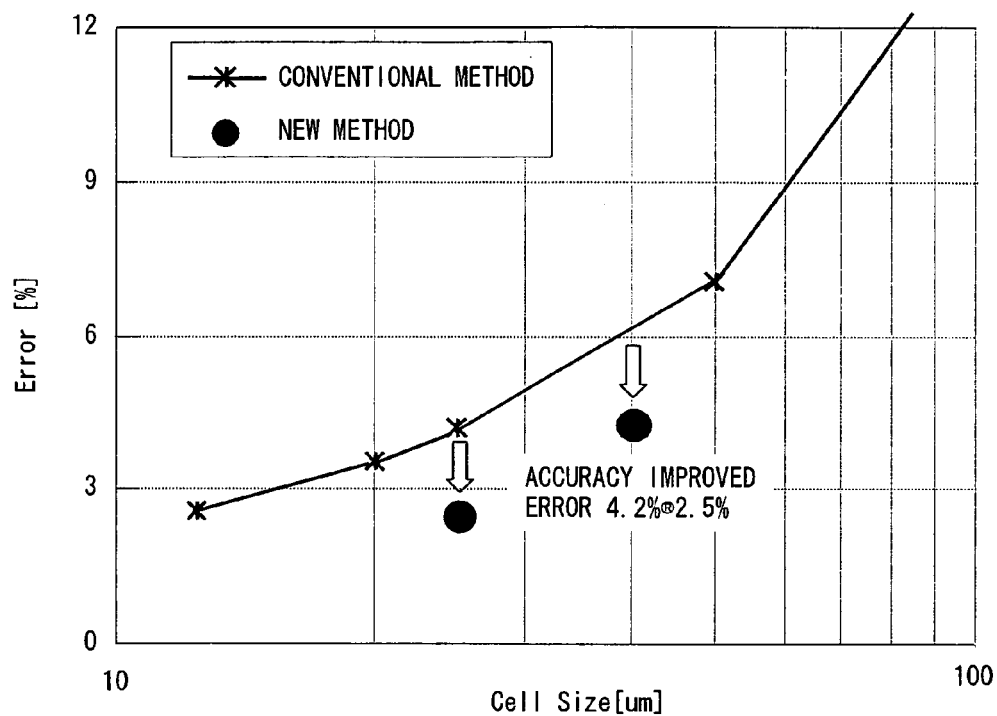
F I G. 2 3

ELECTRIC/MAGNETIC FIELD ANALYSIS METHOD USING FINITE DIFFERENCE TIME DOMAIN, MATERIAL DESCRIPTIVE METHOD IN ELECTRIC/MAGNETIC ANALYSIS, ELECTRIC/MAGNETIC ANALYSIS DEVICE, ANALYSIS DATA GENERATION DEVICE AND STORAGE MEDIUM

BACKGROUND OF THE INVENTION

1. Field of the Invention

The present invention relates to a technology for conducting an electric/magnetic field analysis using a finite difference time domain method for dividing an analysis space by a polyhedron cell and differentiating a spatial domain.

2. Description of the Related Art

For one of methods for conducting an electric/magnetic field analysis on antennas, electronic equipment and the like, a finite difference time domain (FDTD) method is used. The FDTD method is a finite difference method proposed by K. S. Yee. Since the FDTD method has an advantage that the necessary amount of memory is proportional to the number of cells, over other methods, attention is paid to the FDTD method as a useful method in the electric/magnetic field analysis.

In the FDTD method, a spatial domain is differentiated by dividing an analysis space by a polyhedron called a cell. For the polyhedron, usually a hexahedron, that is, a cube or a rectangular parallelepiped, is adopted. In the cell, generally magnetic field intensity and electric field intensity are disposed at the center of each surface and at the center of each side constituting the surface. By spatially shifting both magnetic and electric field intensity by half a cell and differentiating them, Maxwell's equations that the rotation of an electric field generates a magnetic field and the rotation of a magnetic field generates an electric field can be directly solved. The size of a cell is generally set to 1/10 or less of the shortest target wavelength.

Since an analysis space is divided by such a cell, a step approximation method for approximating its shape (boundary) step by step along the side (grating) or surface is conventionally used to express an analysis target object, such as a conductor and the like. However, in the step approximation method, in reality, there is often a great difference between an expressed shape and an actual shape depending on its cell size. For example, as shown in FIG. 1, if an analysis target object is a circular patch antenna 11, the boundary of the section is expressed as shown in FIG. 2 when its cell size is fairly large. Accordingly, the difference between the expressed shape and its actual shape becomes large.

The great difference in the shape of a boundary degrades analysis accuracy. Therefore, in order to obtain sufficient analysis accuracy, its cell size must be set small. However, if the cell size is set small, the number of cells increases. As the number increases, calculation cost, that is, necessary computer sources and calculation time increase. Therefore, in order to suppress the calculation cost while realizing sufficient analysis accuracy, it is important to express the shape of an analysis target object with high accuracy.

For the method for expressing the shape of an analysis target object with high accuracy while suppressing the increase of the number of cells, a method for transforming the shape of a cell can be used. However, the method requires modeling according to the shape of the analysis target object, which lacks generality. Therefore, in order to express the shape of an analysis target object with high accuracy, it is important to not only to suppress the increase of the number of cells, but also to give generality.

SUMMARY OF THE INVENTION

It is an object of the present invention to provide a general technology for conducting an electric/magnetic field analysis with higher accuracy while suppressing calculation cost, by more accurately expressing the shape (boundary) of an analysis target object (medium) existing in an analysis space without reducing a cell size.

The electric/magnetic field analysis method using the finite difference time domain method of the present invention conducts an electric/magnetic field analysis using a finite difference time domain method for dividing an analysis space by a polyhedron cell and differentiating a spatial domain. The electric/magnetic field analysis method comprises setting the boundary between materials existing in an analysis space, specifying a surface on which a boundary exists, out of surfaces constituting a cell used to divide the analysis space, approximating according to at least one pattern in which a boundary existing on the specified surface is predetermined, and conducting an electric/magnetic field analysis to calculate both the electric field intensity and magnetic field intensity of the surface.

In the approximation according to the pattern of a boundary existing on the surface, it is preferable to calculate the intersection between a centerline which goes through the center of the surface on the surface and is parallel to one of the coordinate axes, and to designate a line orthogonal to the centerline as a new boundary. If two intersections are obtained by crossing the boundary and each of different coordinate axes, it is preferable to express a new boundary using two orthogonal lines obtained for each centerline.

In the approximation according to the pattern of a boundary existing on the surface, it is preferable to calculate the intersection between a centerline which goes through the center of the cell that has the surface and is parallel to one of the coordinate axes, and to designate a line obtained by crossing a surface orthogonal to the centerline and the surface, as a new boundary.

If one of two materials touching each other on a boundary existing on a surface is a conductor and the other is a dielectric, it is preferable to calculate the electric field intensity to be calculated of the dielectric on the surface, using a plurality of magnetic field intensities of the dielectric, calculated in the vicinity of the surface and to calculate the magnetic field intensity to be calculated of the dielectric on the surface, using both electric field intensities of the dielectric, calculated in the vicinity of the surface. If the two materials touching each other on a boundary existing on a surface are both dielectrics, it is preferable to calculate the electric field intensity and magnetic field intensity, using electric and magnetic field intensities that are calculated in the two dielectrics.

As to the electric/magnetic field intensity, it is preferable to calculate them by correcting at least one of the electric and magnetic field intensity calculated on the surface on which the boundary exists, after calculating all of them assuming that a boundary exists along the side of the surface.

A material expression method in the electric/magnetic field analysis of the present invention expresses a material in an electric/magnetic field analysis using a finite difference time domain method for dividing an analysis space by a polyhedron cell and differentiating a spatial domain. The material expression method comprises setting a boundary between materials existing in the analysis space, specifying a surface on which a boundary exists, out of surfaces constituting a cell used to divide the analysis space, and approximating a boundary existing on the specified surface according to at least one pattern in which a boundary existing on the specified surface is predetermined.

The electric/magnetic field analysis in the first and second aspects of the present invention both presume that an electric/magnetic field analysis is conducted using a finite difference time domain method for dividing an analysis space by a polyhedron cell and differentiating a spatial domain. The electric/magnetic field analysis method comprises the following units.

The electric/magnetic field analysis device in the first aspect comprises a surface specification unit specifying a surface on which a boundary exists between materials, out of surfaces constituting a cell used to divide an analysis space, and an electric/magnetic field analysis unit approximating a boundary existing on the surface specified by the surface specification unit according to at least one predetermined pattern and calculating both electric field intensity and magnetic field intensity by an electric/magnetic analysis.

The electric/magnetic field analysis device in the second aspect comprises a data acquisition unit obtaining data indicating an approximation result according to at least one predetermined boundary between materials on the surface constituting a cell used to divide an analysis space, and an electric/magnetic analysis unit approximating a boundary existing on a surface, based on the data obtained by the data acquisition unit and calculating both electric field intensity and magnetic field intensity by an electric/magnetic field analysis.

The analysis data generation device of the present invention generates analysis data used to conduct an electric/magnetic field analysis, using a finite difference time domain method dividing an analysis space by a polyhedron cell and differentiating a spatial domain. The analysis data generation device comprises a data acquisition unit obtaining both an analysis space and analysis target data in which a boundary is defined between materials existing in the analysis space, a surface specification unit specifying a surface on which a boundary exists, out of surfaces constituting a cell used to divide the analysis space, a boundary approximation unit approximating a boundary existing on the surface specified by the surface specification unit according to at least one predetermined pattern, and a data generation unit generating data indicating the approximation result of a boundary obtained by the boundary approximation unit as analysis data.

Each of the storage media in the first through third aspects of the present invention is a computer-readable storage medium on which is recorded a program for enabling a computer to realize the following functions are recorded.

On the storage medium in the first aspect, a program for enabling a computer to realize a function to obtain both an analysis space and analysis target data in which a boundary is defined between materials existing in the analysis space, and a function to approximate a boundary existing on the surface specified by the specification function and to calculate both electric field intensity and magnetic field intensity by an electronic/magnetic field analysis, is recorded as a program used to conduct an electric/magnetic field analysis, using a finite difference time domain method dividing an analysis space by a polyhedron cell and differentiating a spatial domain.

On the storage medium in the second aspect, a program for enabling a computer to realize a function to obtain both an analysis space and analysis target data in which a boundary is defined between materials existing in the analysis space, a function to analyze the analysis target data obtained by the acquisition function and to specify a surface on which a boundary exists, out of surfaces constituting a cell used to divide the analysis space, a function to approximate a boundary existing on the surface specified by the specification function, and a function to generate data indicating the approximation result of the boundary obtained by the approximation function as analysis data, is recorded as a program used to conduct an electric/magnetic field analysis, using a finite difference time domain method dividing an analysis space by a polyhedron cell and differentiating a spatial domain.

On the storage medium in the third aspect, a program for enabling a computer to realize a function to obtain data indicating an approximation result according to at least one pattern in which a boundary is predetermined between materials on a surface constituting a cell used to divide an analysis space, and a function to approximate a boundary existing on the surface, based on the data obtained by the acquisition function and to calculate both electric field intensity and magnetic field intensity by an electric/magnetic field analysis, is recorded as a program used to conduct an electric/magnetic field analysis, using a finite difference time domain method dividing an analysis space by a polyhedron cell and differentiating a spatial domain.

The present invention specifies a surface on which a boundary exists, out of surfaces constituting a cell used to divide an analysis space, approximates a boundary existing on the specified surface according to at least one pattern and conducts an electric/magnetic field analysis to calculate both the electric field intensity and magnetic field intensity on the surface.

By approximating a boundary according to the pattern, the boundary can be more accurately expressed, compared with the conventional method of approximating a boundary along a surface constituting a cell. By predetermining the pattern, the number of calculation methods adopted to calculate both electric field intensity and magnetic field intensity can be suppressed or/and the calculation methods can be simplified. As a result, an electric/magnetic field analysis can be more accurately conducted while suppressing a calculation cost, without reducing a cell size. High generality can also be maintained.

BRIEF DESCRIPTION OF THE DRAWINGS

FIG. 2 shows the conventional approximation method of the boundary of a circular patch antenna;

FIG. 3A shows the approximation method in units of surfaces of a boundary between media in the present invention (No. 1);

FIG. 3B shows the approximation method in units of surfaces of a boundary between media in the present invention (No. 2);

FIG. 3C shows the approximation method in units of surfaces of a boundary between media in the present invention (No. 3);

FIG. 4A shows the approximation method in units of cells of a boundary between media in the present invention (in the case where one intersection is obtained);

FIG. 4B shows the approximation method in units of cells of a boundary between materials in the present invention (in the case where two intersections are obtained);

FIG. 4C shows an approximation method in units of cells of a boundary between materials in the present invention (in the case where three intersections are obtained);

FIG. 5 shows a state where a boundary on which a dielectric and a perfect electric conductor touch each other, exists (No. 1);

FIG. 6 shows a state where a boundary on which a dielectric and a perfect electric conductor touch each other, exists (No. 2);

FIG. 11 shows the circuit configuration of the electric/magnetic field analysis device according to the present invention;

FIG. 13 shows the functional configuration of the electric/magnetic field analysis device;

FIG. 15 shows a specific example of data that the analysis data generation device according to the present invention generates for an electric/magnetic field analysis;

FIG. 16 shows a boundary approximated by data that the analysis data generation device according to the present invention generates for an electric/magnetic field analysis;

FIG. 18 is a flowchart showing the electric/magnetic field analysis process;

FIG. 21A is the perspective illustration of an analysis space to which an electric/magnetic field analysis is applied;

FIG. 21B is the section view of an analysis space to which an electric/magnetic field analysis is applied;

FIG. 21C is the top view of an analysis space to which an electric/magnetic field analysis is applied;

FIG. 23 shows the accuracy of an electric/magnetic field analysis.

DESCRIPTION OF THE PREFERRED EMBODIMENTS

Figure 1:
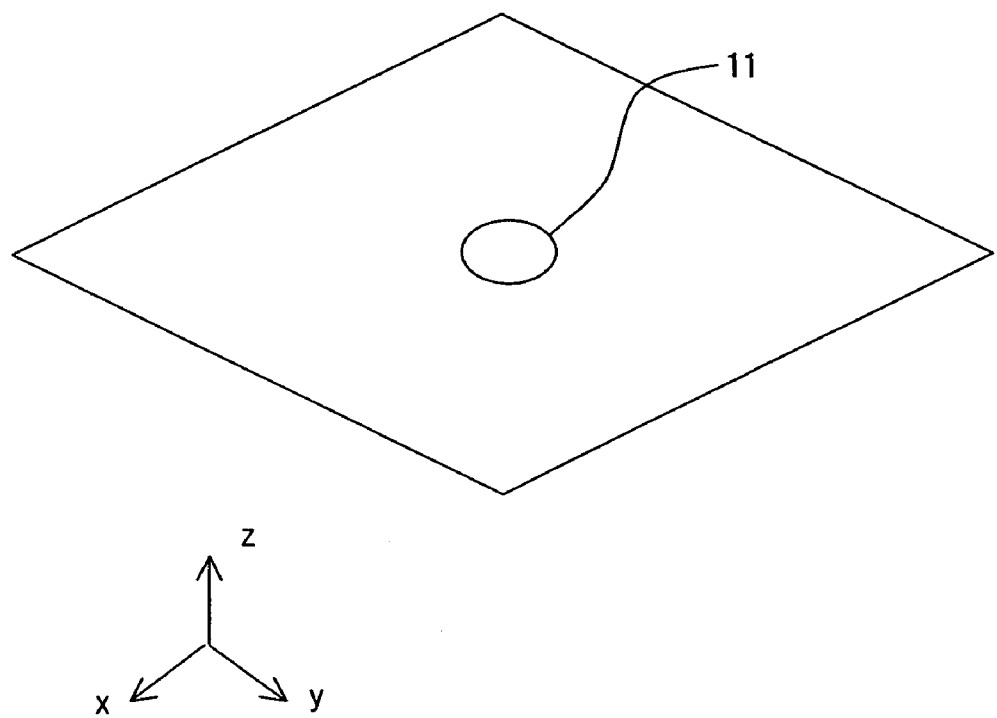
FIG. 1 shows an analysis space in which a circular patch antenna exists as an analysis target object.

The preferred embodiments of the present invention are described in detail below with reference to the drawings.

FIGS. 3A through C and FIGS. 4A through C show the approximation methods of a boundary between materials in this preferred embodiment. FIGS. 3A through C show the approximation method in units of surfaces of a boundary between materials in the present invention. FIGS. 4A through C show the approximation method in units of cells of a boundary between materials in the present invention. Firstly, each approximation method, that is, the expression method of a material is described in detail with reference to FIGS. 3A–C and FIGS. 4A–C.

The centerline expressed in FIGS. 3A–C goes through the center of a surface constituting a cell and is parallel to one of the coordinate axes. Since a line parallel to one of the two coordinate axes can be disposed on the surface by the disposition way of a cell, there exit two parallel centerlines with different coordinate axes. Therefore, in this preferred embodiment, a boundary existing on a surface is approximated by two roughly classified patterns; one pattern in which a boundary intersects with only one centerline and the other in which a boundary intersects with two centerlines.

If a boundary intersects with only one centerline, as shown in FIG. 3A, approximation is conducted using a line that goes through the intersection, which is indicated by a black point in FIG. 3, with the centerline and is orthogonal to the centerline as a new boundary. If a boundary intersects with two centerlines, as shown in FIGS. 3B and 3C, approximation is conducted using an orthogonal line obtained for each centerline as a new boundary. Thus, a new boundary is expressed by the two orthogonal lines. By approximating a new boundary thus, a material portion containing the center on the surface becomes a rectangle.

In boundary approximation in units of cells, different from the boundary approximation in units of surfaces, a centerline that goes through the center of a cell and is parallel to one of coordinate axes, is used. There is such a centerline for each coordinate axis and there are three centerlines in total.

An intersection between each centerline and the boundary is located on the boundary of each coordinate axis parallel to a cell in the cell. There are four surfaces on which a line parallel to the central line (coordinate axis), out of surfaces constituting the cell. Therefore, as shown in FIG. 4A, if a boundary intersects with only one central line, the boundary of each surface on which the line parallel to the central line is approximated as shown in FIG. 3A. Thus, the other two surfaces through which the central line goes, are regarded to belong to another material in which no boundary exists.

If a boundary intersects with two central lines, as shown in FIG. 4B, a boundary is expressed on four surfaces in the same way, and two surfaces through which the central line goes, are regarded to belong to another material in which no boundary exists. If a boundary intersects with three central lines, as shown in FIG. 4C, the same fact applies. Thus, the boundary of a surface on which it is regarded that a boundary exists, out of surfaces constituting a cell, is approximated as shown in one of FIGS. 3A through C, according to the number of central lines that intersect with the boundary.

In boundary approximation in units of surfaces, a boundary must be specified for each surface, and intersections between the boundary and two central lines must be extracted. Therefore, in order to approximate a boundary on all surfaces, a boundary must be specified six times and 12 intersections between the boundary and six central lines must be extracted. However, in boundary approximation in units of cells, a boundary can be approximated on all surfaces only by specifying a boundary for each central line and extracting intersections between the boundary and three central lines. Therefore, compared with boundary approximation in units of surfaces, in boundary approximation in units of cells, approximation can be more rapidly conducted although the difference between an actual boundary and the expressed boundary becomes large.

Electric field intensity and magnetic field intensity on a cell are calculated after a boundary existing on a surface is approximated as described above. Next, the calculation method of both the electric/magnetic field intensity is described in detail with reference to a variety of the drawings shown in FIGS. 5 through 10.

Firstly, a one-dimensional model is used for convenience' sake. In this example, it is assumed that a cell size is not uniform. As to the combination of two materials touching each other on a surface, two cases can be considered. In the first case, one is a dielectric and the other is a perfect electric conductor (PEC). In the second case, both are conductors.

Firstly, the calculation method of the first case is described.

FIGS. 5 and 6 show a state where a boundary on which a dielectric and a PEC touch each other, exists. "E", "H" and "S" shown in FIGS. 5 and 6 represent electric field intensity, magnetic field intensity and a cell size, respectively. "i", "i+1" and the like that are attached to each symbol as subscripts indicates a corresponding cell.

Here, as shown in FIG. 5, it is assumed that electric field intensity $E_i$ is calculated using a position on the z-axis whose electric field intensity $E_i$ as 0. The distance between 0 and PEC is $\gamma/2$.

Maxwell's equations can be expressed in the position as follows.

$$\varepsilon \frac{\partial E}{\partial t}\bigg|_{z=0} = \frac{\partial H}{\partial z}\bigg|_{z=0} \quad (1)$$

where $\in$ is permittivity.

The boundary conditions of PEC can be expressed as follows.

$$\frac{\partial H}{\partial z}\bigg|_{z=-0.5\gamma} = 0 \left( \because \frac{\partial E}{\partial t}\bigg|_{z=-h\gamma} = 0 \right) \quad (2)$$

If Taylor's expansion is applied to equation (2) indicating the boundary conditions around z=0, the following equation can be obtained.

$$\frac{\partial H}{\partial z}\bigg|_{z=-0.5\gamma} = \frac{\partial H}{\partial z}\bigg|_{z=0} - \frac{\gamma}{2}\frac{\partial^2 H}{\partial z^2}\bigg|_{z=0} + O(\gamma^2) = 0 \quad (3)$$

If a discrete interval on a spatial or time axis is sufficiently small, the third term in the right side of equation (3) can be neglected. Therefore, the $$\therefore \frac{\partial H}{\partial z}\bigg|_{z=0} \cong \frac{\gamma}{2}\frac{\partial^2 H}{\partial z^2}\bigg|_{z=0} \quad (4)$$

following equation can be obtained.

Magnetic field intensity $H_i$ and $H_{i+1}$ can be expressed as follows transforming equation (3).

$$H_i = H(0) + \frac{S_i}{2}\frac{\partial H}{\partial z}\bigg|_{z=0} + \frac{S_i^2}{8}\frac{\partial^2 H}{\partial z^2}\bigg|_{z=0} + O(S_i^3) \quad (5)$$

$$H_{i+1} = H(0) + \left(S_i + \frac{S_{i+1}}{2}\right)\frac{\partial H}{\partial z}\bigg|_{z=0} + \quad (6)$$
$$\frac{1}{2}\left(S_i + \frac{S_{i+1}}{2}\right)^2 \frac{\partial^2 H}{\partial z^2}\bigg|_{z=0} + O\left(\left(S_i + \frac{S_{i+1}}{2}\right)^3\right),$$

where $H(0)$ is magnetic field intensity in the position z=0.

If the respective third terms of equations (5) and (6) are both neglected, the difference between electric field intensity $E_{i+1}$ and $E_i$ can be calculated as follows according to equation (4).

$$H_{i+1} - H_i = \frac{1}{2}(S_i + S_{i+1})\frac{\partial H}{\partial z}\bigg|_{z=0} + \quad (7)$$
$$\left(\frac{3}{8}S_i^2 + \frac{1}{2}S_i S_{i+1} + \frac{1}{8}S_{i+1}^2\right)\frac{\partial^2 H}{\partial z^2}\bigg|_{z=0}$$
$$= \left\{\frac{1}{2}(S_i + S_{i+1}) + \frac{1}{4\gamma}(3S_i^2 + 4S_i S_{i+1} + S_{i+1}^2)\right\}\frac{\partial H}{\partial z}\bigg|_{z=0}$$
$$= \left\{\frac{1}{2}(S_i + S_{i+1}) + \frac{1}{4\gamma}(3S_i + S_{i+1})(S_i + S_{i+1})\right\}\frac{\partial H}{\partial z}\bigg|_{z=0}$$
$$= (S_i + S_{i+1})\left\{\frac{2\gamma + 3S_i + S_{i+1}}{4\gamma}\right\}\frac{\partial H}{\partial z}\bigg|_{z=0}$$

From equation (7), the following equation can be obtained.

$$\frac{\partial H}{\partial z}\bigg|_{z=0} = \frac{4\gamma}{(S_i + S_{i+1})(2\gamma + 3S_i + S_{i+1})}(H_{i+1} - H_i) \quad (8)$$

As clear from equation (8), magnetic field intensity in the position z=0 can be obtained by extrapolation calculation using magnetic field intensity calculated in the vicinity of the same medium. Electric field intensity $E_i$ can be calculated using the magnetic field intensity.

Then, as shown in FIG. 6, magnetic field intensity $H_i$ is calculated using a position on the z-axis whose magnetic field intensity $H_i$ is calculated, as 0. The distance between 0 and PEC is $\gamma$.

The boundary conditions of the PEC can be similarly expressed by equation (2). Thus, electric field intensity in the position z=0 can be obtained by interpolation calculation using both electric field intensity on the boundary of the PEC and electric field intensity $E_{i+1}$ as follows. Magnetic field intensity $H_i$ can be calculated using the electric field intensity obtained thus.

$$\varepsilon \frac{\partial E}{\partial t}\bigg|_{z=0} = \frac{2}{S_i + 2\gamma}E_{i+1} \quad (9)$$

Next, the calculation method of the second case is described.

Figure 7:
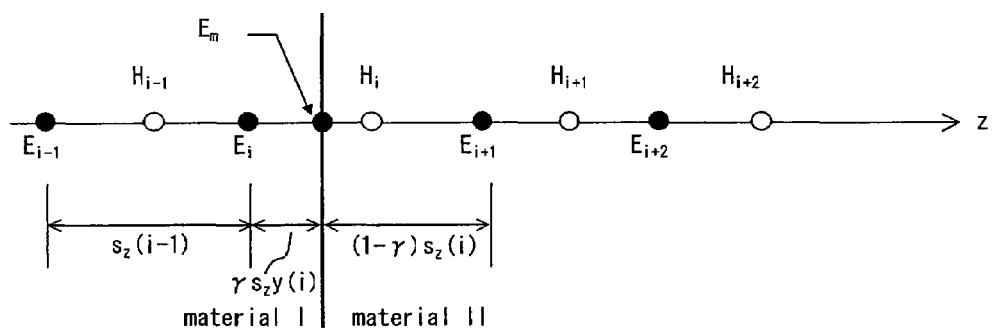
FIG. 7 shows a state where different dielectrics touch each other, exists (No. 1)
Figure 8:
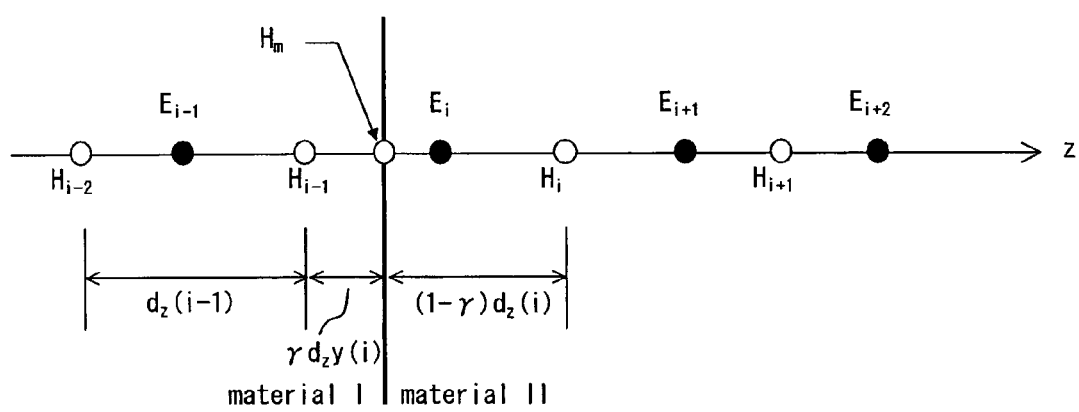
FIG. 8 shows a state where different dielectrics touch each other, exists (No. 2)

FIGS. 7 and 8 show a state where a boundary on which different dielectrics touch each other, exists. The respective meanings of "E" and "H" and "i", "i+1", etc., that are attached to the symbols as subscripts, shown in FIGS. 7 and 8 are the same as those in FIGS. 5 and 6. "sz" shown in FIG. 7 and "dz" shown in FIG. 8 both correspond to "S" shown in FIGS. 5 and 6, and parenthesized "i", "i+1", etc., that are attached to "S" indicate corresponding cells. "γ" indicates a ratio obtained by dividing a distance between a boundary existing in a cell and the lowest coordinate position by the size of the cell.

Firstly, magnetic field intensity $H_i$ shown in FIG. 7 is calculated.

Maxwell's equations in a position whose magnetic field intensity $H_i$ is calculated can be expressed as follows.

$$\mu \cdot \partial H_i/\partial t = -\partial E_i/\partial z, \quad (10)$$

where μ is permeability.

In an analysis by the FDT method, equation (10) can be transformed as follows.

$$\mu \cdot (H_i^n - H_i^{n-1})/\Delta t = (E_m^n - E_{i+1}^n)/[(1-\gamma)sz(i)], \quad (11)$$

where $E_m$, "n" attached to $E_m$ on its shoulder and Δt indicate electric field intensity on a boundary, the n-th time step and a time step width, respectively.

From equation (11), the following equation can be obtained.

$$H_i^n = H_i^{n-1} + (\mu/\Delta t) \cdot (E_m^n - E_{i+1}^n)/[(1-\gamma)sz(i)] \quad (12)$$

By assigning the following equation, $$E_m^n - E_1^n = (\gamma \cdot sz(i)/sz(i-1) \cdot (E_i^n - E_{i-1}^n)), \quad (13)$$

electric field intensity in equation (12) is calculated according the following equation.

$$E_m^n = E_1^n + (\gamma \cdot sz(i)/sz(i-1) \cdot (E_i^n - E_{i-1}^n)) \quad (14)$$

Next, electric field intensity $E_i$ shown in FIG. 8 is calculated.

Maxwell's equations in a position whose electric field intensity $E_i$ is calculated can be expressed as follows.

$$\in \cdot \partial E_i/\partial t + \sigma E_i = -\partial H_i/\partial z, \quad (15)$$

where σ is permittivity.

In an analysis by the FTD method, equation (15) can be transformed as follows.

$$\in (E_i^n - E_i^{n-1})/\Delta t + \sigma(E_i^n + E_i^{n-1})/2 = (H_i^n - H_m^n)/[(1-\gamma)dz(i)], \quad (16)$$

where $H_m$ is magnetic field intensity on a boundary.

B transforming equation (11), the following equation can be obtained.

$$(\in/\Delta t + \sigma/2)E_i^n = (\in/\Delta t + \sigma/2)E_i^{n-1} + (H_i^n - H_m^n)/[(1-\gamma)dz(i)] \quad (17)$$

Therefore, electric field intensity $E_i^n$ can be calculated according to the following equation.

$$E_i^n = [(2\in - \Delta t\sigma)/(2\in + \Delta t\sigma)]E_i^{n-1} + [2\Delta t/(2\in + \Delta t\sigma)] \cdot (H_i^n - H_m^n)/[(1-\gamma)dz(i)] \quad (18)$$

By assigning the following equation, $$H_m^n - E_{i-1}^n = (\gamma \cdot dz(i)/dz(i-1)) \cdot (H_{i-1}^n - H_{i-2}^n), \quad (19)$$

magnetic field intensity $H_m^n$ in equation (18) can be calculated according to the following equation.

$$H_m^n = H_{i-1}^n + (\gamma \cdot dz(i)/dz(i-1)) \cdot (H_{i-1}^n - H_{i-2}^n) \quad (20)$$

Hereinafter, $(2\in - \Delta t\sigma)/(2\in + \Delta t\sigma)$ and $2\Delta t/(2\in + \Delta t\sigma)$ are also described to be coefficients k1 and k2, respectively.

Figure 9:
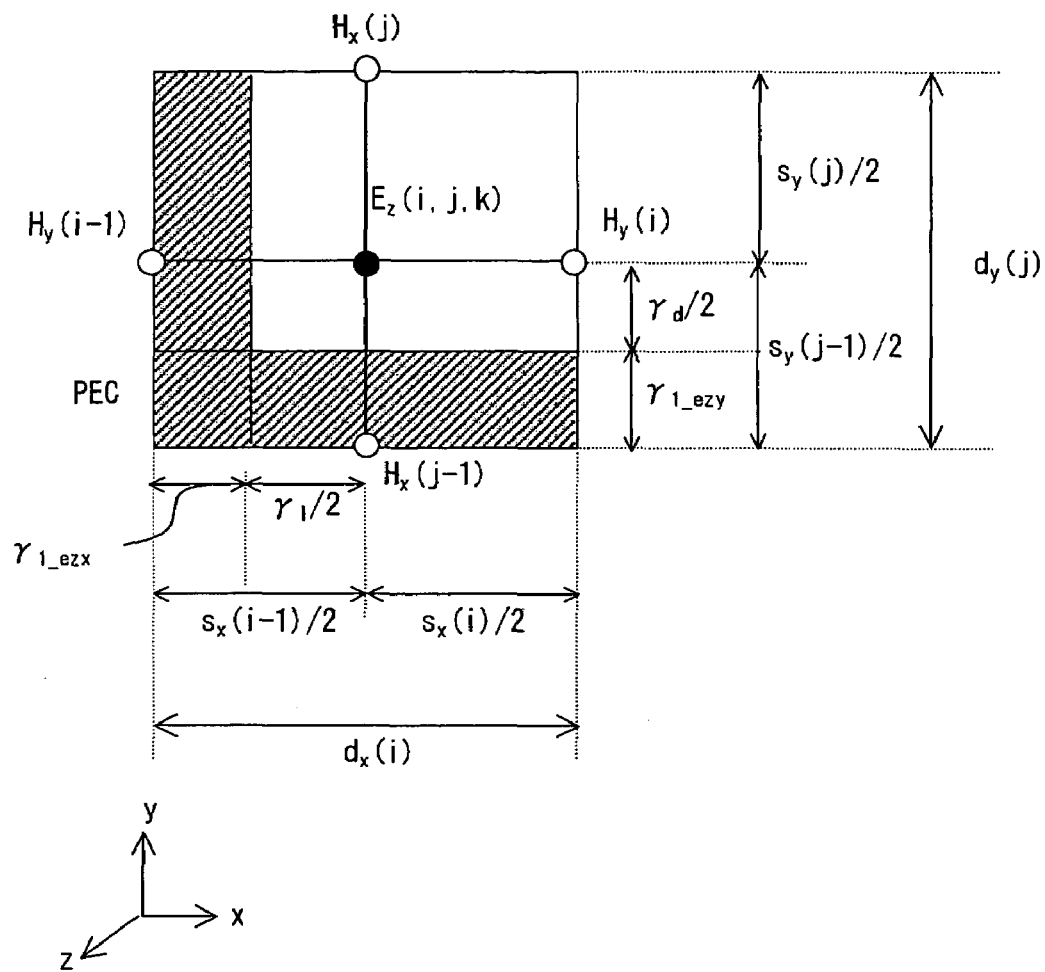
FIG. 9 explains the calculation method of an electric/magnetic field assuming two dimensions (No. 1)
Figure 10:
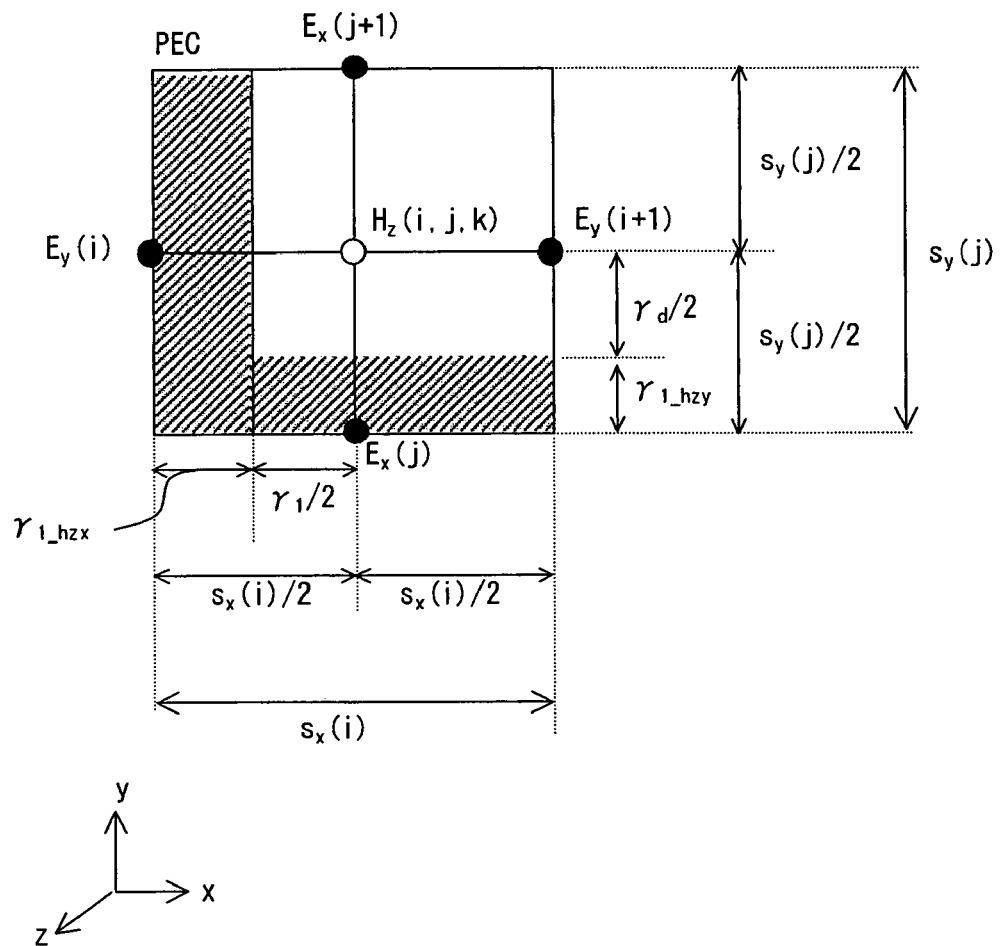
FIG. 10 explains the calculation method of an electric/magnetic field assuming two dimensions (No. 2)

FIGS. 9 and 10 show the calculation method of magnetic field intensity assuming a two-dimension model.

Hereinafter, the calculation method of magnetic field intensity assuming a two-dimension model is described with reference to FIGS. 9 and 10.

In FIG. 9, "x", "y" and "z" that are attached to symbols "E" and "H" as subscripts indicate the direction of electric/magnetic field intensity. "$E_z(i,j,k)$" indicates the electric field intensity in the z-axis direction of a cell whose xyz coordinate positions are designated by values i, j and k. In the parenthesis of magnetic field intensity H disposed around the electric field intensity, only a cell number corresponding to a coordinate axis whose coordinate position is different from the position of electric field intensity $E_z(i,j,k)$ is described for convenience' sake. Thus, for example, in magnetic field intensity $H_x$ disposed in the positive direction of the y-direction from the position of electric field intensity $E_z(i,j,k)$, only j is described in the parenthesis. "$S_x$" and "$S_y$" indicate the respective length on the x/y-axes, respectively, of a cell size. In the parenthesis attached to the symbols, only the number indicating length of a cell corresponding to the coordinate axis is described. The above descriptions also apply to FIG. 10.

Firstly, the calculation method of the electric field intensity $E_z(i,j,k)$ shown in FIG. 9 is described.

The slashed portion shown in FIG. 9 indicates electric field intensity $E_z(i,j,k)$ and a PEC (perfect electric conductor) on a virtual surface containing four segments of magnetic field intensity H disposed around the electric field intensity. If the PEC does not exist, an equation for calculating electric field intensity $E_z^n(i,j,k)$ in the n-th time step is expressed as follows, using the notation shown in FIG. 9.

$$E_z^n(i,j,k) = [(2\in - \Delta t\sigma)/(2\in + \Delta t\sigma)]E_z^{n-1}(i,j,k) + [2\Delta t/(2\in + \Delta t\sigma)] \cdot [(H_y^n(i) - H_y^n(i-1)/d_x(i) - (H_x^n(j) - H_x^n(j-1)/d_y(j))] \quad (21)$$

If $(H_y^n(i) - H_y^n(i-1)/d_x(i)$ and $(H_x^n(j) - H_x^n(j-1)/d_y(j)$ are expressed using $\partial H_y/\partial x$ and $\partial H_x/\partial y$, equation (21) can be expressed as follows, using the coefficients k1 and k2.

$$E_z^n(i,j,k) = k1 \cdot E_z^{n-1}(i,j,k) + k2[\partial H_y/\partial x - \partial H_x/\partial y] \quad (22)$$

If a boundary exists in a position away from electric field intensity $E_z(i,j,k)$ by a distance $\gamma_d/2$ in the negative direction of the y-axis, $\partial H_y/\partial x$ in equation (22) can be modified as follows, according to equations (8) through (21).

$$\partial H_y/\partial x = 4\gamma_d/[(s_x(i) + s_x(i+1) \cdot (2\gamma_d + s_x(i) + s_x(i+1))) \cdot (H_y^n(i+1) - H_y^n(i)) \quad (23)$$

Similarly, if a boundary exists in a position away from electric field intensity $E_z(i,j,k)$ by a distance $\gamma_d/2$ in the negative direction of the x-axis, $\partial H_x/\partial y$ in equation (22) can be modified as follows, according to equations (8) through (21).

$$\partial H_x/\partial y = 4\gamma_1/[(s_y(j) + s_y(j+1) \cdot (2\gamma_1 + s_y(j) + s_y(j+1))) \cdot (H_x^n(j+1) - H_x^n(j)) \quad (24)$$

Next, the calculation method of magnetic field intensity $H_z(i,j,k)$ shown in FIG. 10 is described.

Similarly, the slashed portion shown in FIG. 10 indicates magnetic field intensity $H_z(i,j,k)$ and a PEC (perfect electric conductor) on a virtual surface containing four segments of magnetic field intensity H disposed around the electric field intensity. If a PEC does not exist, an equation for calculating magnetic field intensity $H_z^n(i,j,k)$ in the n-th time step is expressed as follows, using the notation shown in FIG. 10.

$$H_z^n(i,j,k)=H_z^{n-1}(i,j,k)-(\Delta t/\mu)[(E_y^n(i+1)-E_y^n(i)/s_x(i)-(E_x^n(j+1)-E_x^n(j))/s_y(j))] \quad (25)$$

If $(E_y^n(i+1)-H_y^n(i))/s_x(i)$, $(E_x^n(j+1)-E_x^n(j))/s_y(j)$ and $\Delta t/\mu$ are expressed by $\partial E_y/\partial x$, $\partial E_x/\partial y$ and k3, equation (25) can be expressed as follows.

$$H_z^n(i,j,k)=H_z^{n-1}(i,j,k)-k3[\partial E_y/\partial x-\partial E_x/\partial y] \quad (26)$$

If a boundary exists in a position away from magnetic field intensity $H_z(i,j,k)$ by a distance $\gamma_1/2$ in the negative direction of the x-axis, $\partial H_y/\partial x$ in equation (22) can be modified as follows, according to equations (9) through (25).

$$\partial E_y/\partial x=[2/(\gamma_1+s_x(i))E_y^n(I+1)] \quad (27)$$

Similarly, if a boundary exists in a position away from magnetic field intensity $H_z(i,j,k)$ by a distance $\gamma_d/2$ in the negative direction of the y-axis, $\partial E_x/\partial y$ in equation (26) can be modified as follows, according to equations (9) through (25).

$$\partial E_x/\partial y=[2/(\gamma_d+s_y(ji))E_x^n(j+1)] \quad (28)$$

Even if electric field intensity E and magnetic field intensity H are for a different component, it can be similarly calculated.

If one of two materials touching each other on a boundary is not a PEC, that is, if two materials touching each other on a boundary both are dielectrics, an equation led by equations (13) and (14) or an equation led by equations (18) and (20) is similarly used instead of equations (23), (24), (27) and (28).

If the combination of two types of materials touching each other on a boundary is different, an equation used to calculate electric field intensity E and magnetic field intensity H that should be calculated using a boundary can be formulated by approximating a boundary as shown in FIG. 3 or 4. As clear from equations (23), (24), (27) and (28), the number of new values to be calculated can be suppressed by using a boundary. Compared with the use of an integration path including a boundary for the purpose of calculating magnetic field intensity H, the number of new values to be calculated can be made very small. Therefore, the calculation cost of the electric/magnetic field analysis (, such as computer resources, calculation time, etc.) can be suppressed.

FIG. 11 shows the circuit configuration of the electric/magnetic field analysis device of this preferred embodiment.

As described above, the device approximates a boundary and conducts an electric/magnetic field analysis. As shown in FIG. 11, the device comprises a CPU 111, memory 112, an input device 113, an output device 114, an external storage device (supplementary storage device) 115, a medium driving device 116 and a network connection device 117, which are all connected to each other by a bus 118. This device can be realized by loading the program of this preferred embodiment onto a computer (data processing device), such as a personal computer or a workstation.

For the memory 112, semi-conductor memory, such as a ROM or RAM, is used. A keyboard and a pointing device, such as a mouse or the like are connected to the input device 113. The input device 113 detects a user's operation made using them. The output device 114 is an interface for outputting image data to display an image on a display. For the external storage device 115, a hard disk device or the like is used, and stores a program to be executed by the CPU 111, a variety of data and the like. The medium driving device 116 accesses a portable storage medium M, such as a flexible disk, an optical disk, a magneto-optical disk or the like. The network connection device 117 is used to communicate with external devices through a communication network. The electric/magnetic field intensity analysis device of this preferred embodiment can be, for example, realized by the CPU 111 executing the program stored in the external storage device 115 and utilizing hardware resources.

The electric/magnetic field intensity analysis device with such a configuration comprises an analysis data generation device of this preferred embodiment. The generation device generates data indicating the result of the boundary approximation described above as analysis data.

Figure 12:
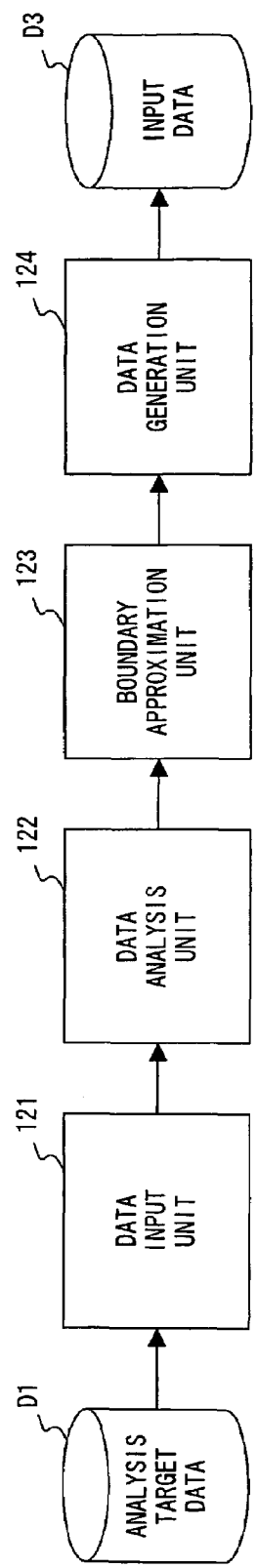
FIG. 12 shows the functional configuration of the analysis data generation device according to the present invention.

FIG. 12 shows the functional configuration of such a generation device. The functional configuration can be, for example, realized by the CPU 111 executing an analysis data generation program (hereinafter called "GUI processing program") stored in the external storage device 115 and utilizing hardware resources.

The analysis target data D1 shown in FIG. 12 includes an analysis space, the size of a cell used to divide the analysis space, boundary conditions, the respective characteristics of materials existing in the analysis space, a boundary between the materials and the like. A data input unit 121 inputs such target data D1.

A data analysis unit 122 analyzes the target data Q1 inputted by the data input unit 121 and specifies a boundary in units of cells or in units of surfaces constituting a cell. A boundary approximation unit 123 approximates the boundary specified by the data analysis unit 122, as shown in FIG. 3 or 4. A data generation unit 124 generates data indicating the boundary approximation result of the boundary approximation unit 123 (hereinafter called "approximation result data"), and outputs input data D2 including the data. An electric/magnetic field analysis is conducted by inputting the input data D2.

The data input unit 121 and data generation unit 124 can be, for example, realized by the CPU 111, external storage device 115, medium driving device 116, network connection device 117 and bus 118. The data analysis unit 122 and boundary approximation unit 123 can be, for example, realized by the CPU 111, external storage device 115, medium driving device 116 and bus 118.

In the electric/magnetic field analysis of this preferred embodiment, electric field intensity E in each position, calculated by a step approximation method for approximating a boundary between media along a surface constituting a cell (hereinafter called "conventional method") is corrected by another electric field intensity E in the position, calculated by such a different boundary approximation method as described above (hereinafter called "new method"). This is because by doing so, there is no need to check a calculation method (existence/non-existence of a boundary to be used) every time electric field intensity E is calculated, and as a result, the number of branch instructions executed by a program for an electric/magnetic field analysis (hereinafter called "solver") can be suppressed. Therefore, a higher-speed calculation can be realized. Since a program for conducting an electric/magnetic field analysis by the conventional method can be used, program development becomes easier. For this reason, data used to conduct an electric/magnetic analysis by the conventional method is also outputted as input data D2. Since the data D2 is publicly known, its detailed description is omitted here.

Here, approximation result data outputted as input data D2 is specifically described with reference to a variety of the drawings shown in FIGS. 14 through 16.

Figure 14:
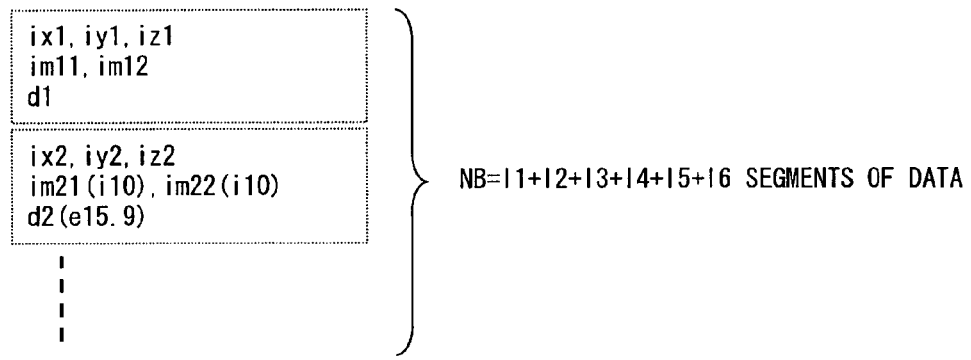
FIG. 14 shows the structure of data that the analysis data generation device according to the present invention generates for an electric/magnetic field analysis.

FIG. 14 shows the structure of the approximation result data.

"i1" shown in FIG. 14 indicates the number of surfaces on which a boundary intersects with the x-axis, out of surfaces on which magnetic field intensity H with the z-axis component is disposed. Other "i2" through "i6" also indicate the same number.

"ix1", "iy2" and "iz1" are data indicating a coordinate position where magnetic field intensity H to be corrected. "im11" and "im12" indicate numbers assigned to two materials disposed side by side when seen from a predetermined direction. "d1" indicates a distance between the side of a predetermined surface and a boundary.

The data is outputted for each magnetic field intensity H to be corrected. By the data, data for the total of "i1–6" is stored in the input data D2. Therefore, as shown in FIG. 16, a boundary existing on a surface on which magnetic field intensity H to be corrected is disposed can be approximated.

If one of two materials touching each other is a PEC, both the electric field intensity E and magnetic field intensity H of the PEC including a boundary become 0. However, if it is a dielectric, the same does not apply. Therefore, both the electric field intensity E and magnetic field intensity H that should be corrected varies depending on the combination of two materials touching each other.

In FIG. 4A, a vertically extended centerline and a horizontally extended centerline are parallel to the y- and x-axes, respectively. If as shown in FIG. 4A, a boundary exists only in one cell, data, for example, shown in FIG. 15, is stored in the input data D2.

Figure 17:
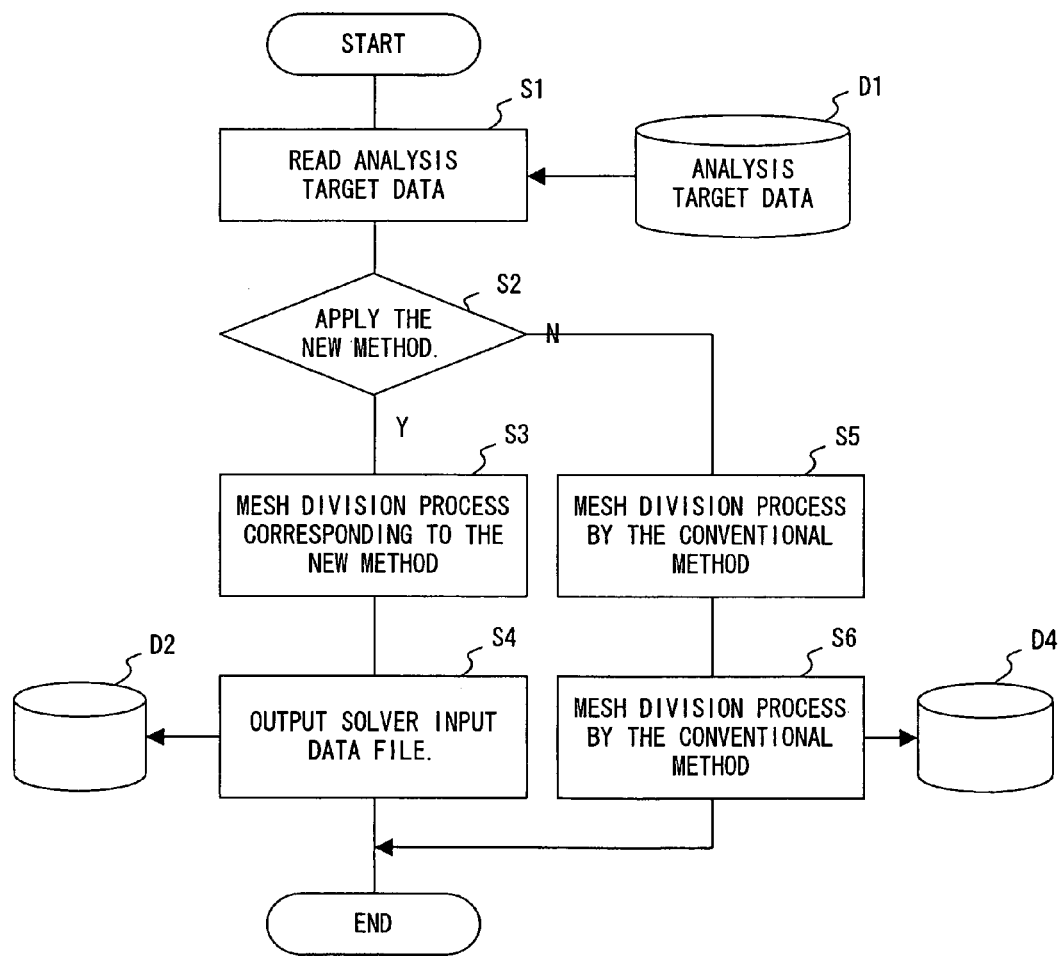
FIG. 17 is a flowchart showing the input data generation process.

Next, the input data generation process realized by the CPU 111 executing the GUI processing program is described in detail with reference to the flowchart shown in FIG. 17. The generation process is, for example, executed by designating analysis target data D1 to be read in a state where the program is started to run and by a user instructing the generation of input data D2 through the input device 111.

Firstly, in step S1, the analysis target data D1 designated by the user is read from the external storage device 115, or through the medium driving device 116 or network connection device 117. Then, in step S2, it is determined whether the new method is applied. If the user instructs the application, the determination becomes yes, and the process proceeds to step S3. If not, the determination becomes no, and the process proceeds to step S5.

In step S3, a mesh division process corresponding to the new method is performed to generate input data D2. In step S4, the generated input data D2 is stored in a storage place designated by the user by transmitting the data to the external storage device 115, medium driving device 116 or network connecting device 117 as a file. Then, a series of the processes terminates.

However, in step S5, a mesh division process corresponding to the conventional method is executed to generate conventional method input data D4. Then, in step S6, the generated input data D4 is stored in a storage place designated by the user by transmitting the data to the external storage device 115, medium driving device 116 or network connecting device 117 as a file. Then, a series of the processes terminates.

FIG. 13 shows the functional configuration of the electric/magnetic field analysis device of this preferred embodiment. The functional configuration can be realized, for example, by the CPU 111 executing the solver stored in the external storage device 115 and utilizing hardware resources. A data input unit 131 inputs the input data D2 generated thus. An electric/magnetic field analysis unit 132 receives the input data D2 from the input data unit 131, conducts an electric/magnetic field analysis by the conventional method, and transmits both the electric field intensity E and magnetic field intensity H that are calculated by the electric/magnetic field analysis, to an electric/magnetic field correction unit 133. Thus, the electric field intensity E and magnetic field intensity H is corrected after completing all calculations.

The approximation result data in the input data D2 is for magnetic field intensity H to be corrected. Therefore, the electric/magnetic field correction unit 133 receives the approximation result data from the data input unit 131, and corrects magnetic field intensity H designated by the result data. The electric/magnetic field correction unit 133 generates data for electric field intensity E to be corrected from the approximation result data, and corrects electric field intensity E designated by the data. The structure of the data is basically the same as the approximation result data. For this reason, the data is hereinafter called "generation approximation result data" for convenience's sake.

An analysis result output unit 134 receives the electric field intensity E and magnetic field intensity H that are calculated in time step from the electric/magnetic field correction unit 133, extracts necessary electric field intensity E and magnetic field intensity H according to an output setting designated by a user and outputs them as time series analysis data D3.

The data input unit 121 and analysis result output unit 134 can be realized, for example, by the CPU 111, external storage device 115, medium driving device 116, network connection device 117 and bus 118. The electric/magnetic field analysis unit 132 and electric/magnetic field correction unit 133 can be realized, for example, by the CPU 111, external storage device 115, driving medium device 116 and bus 118.

Figure 19:
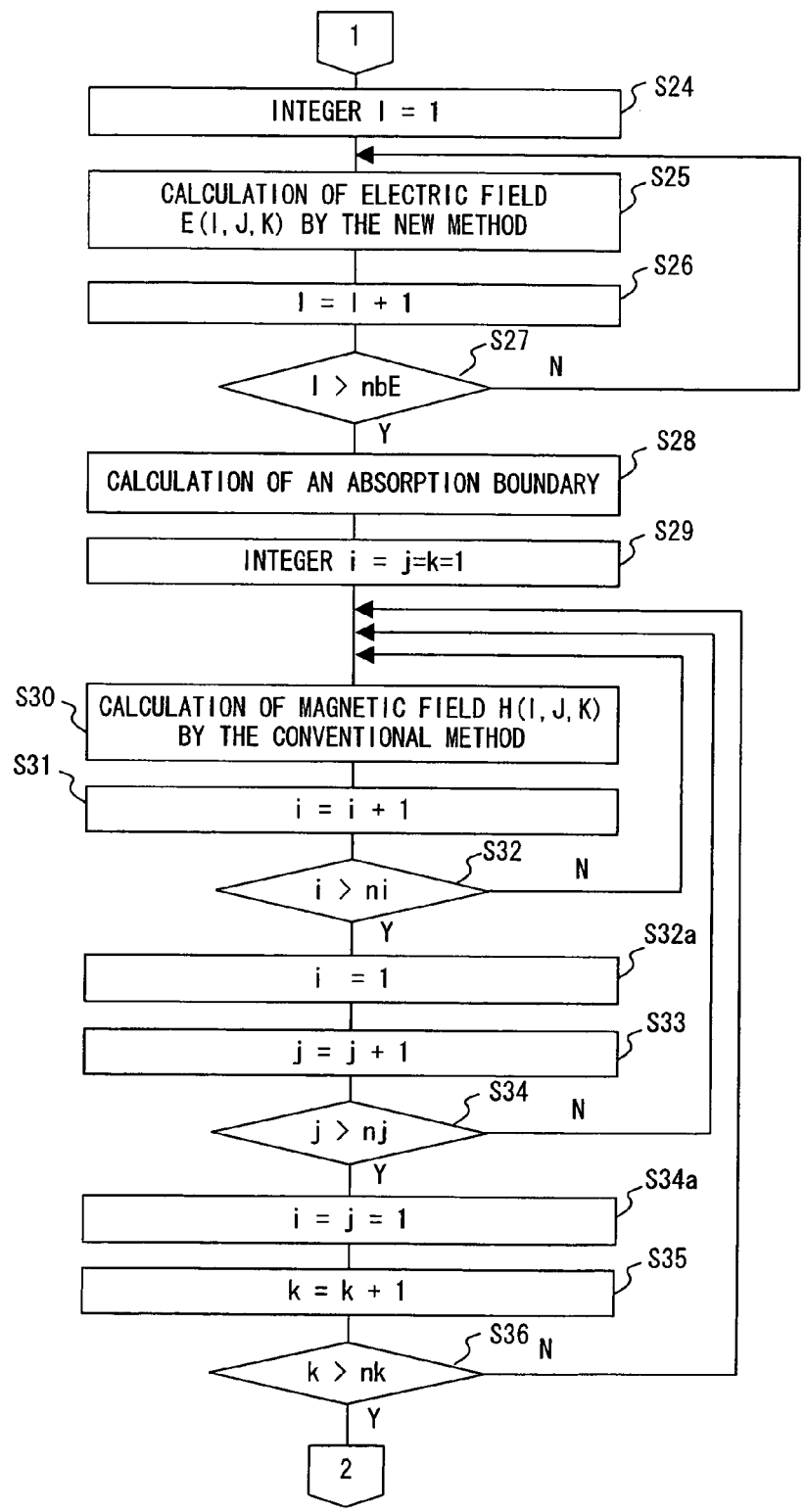
FIG. 19 is a flowchart showing the electric/magnetic field analysis process (Continued 1)
Figure 20:
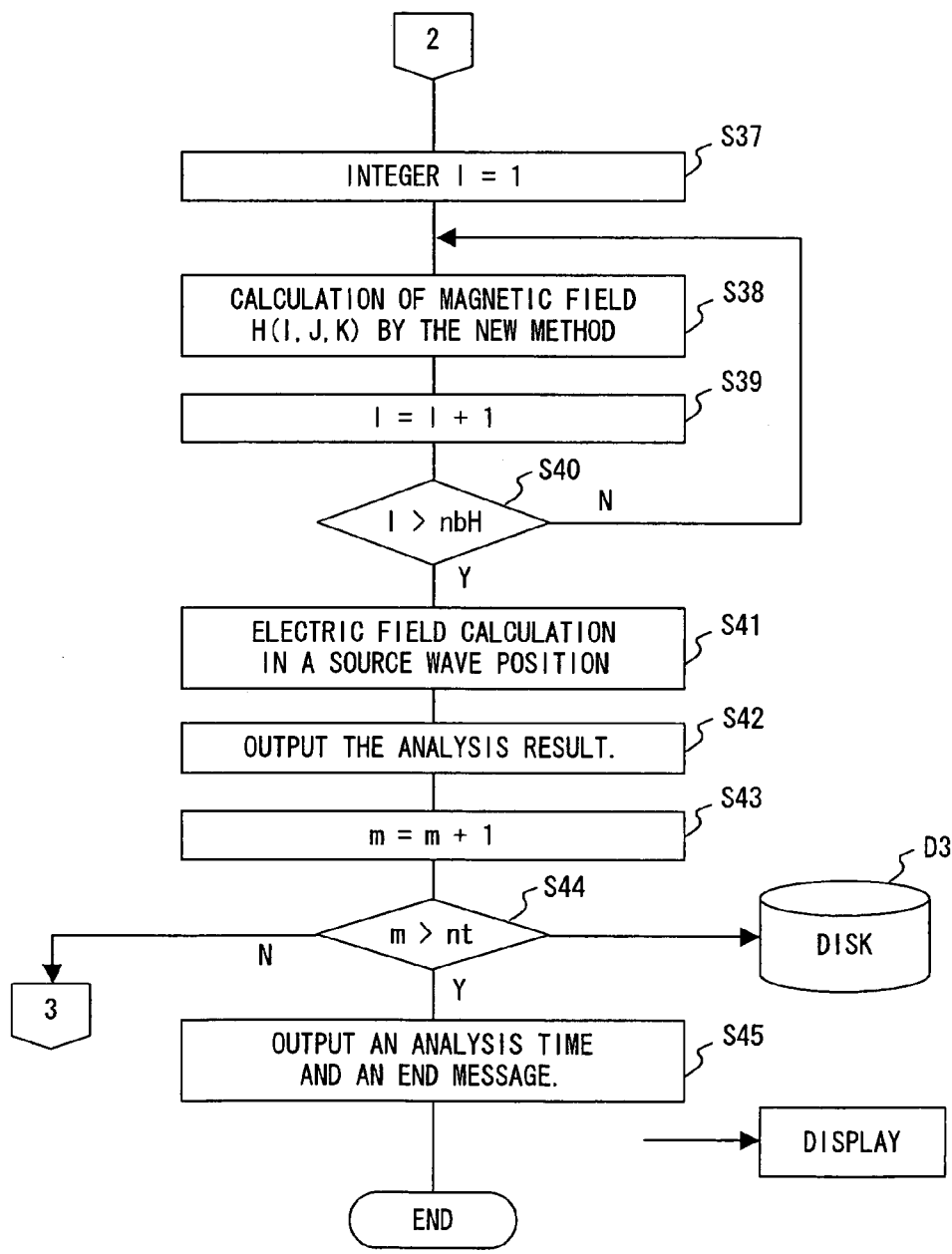
FIG. 20 is a flowchart showing the electric/magnetic field analysis process (Continued 2)

FIGS. 18 through 20 are flowcharts showing the electric/magnetic field analysis process realized by the CPU 111 executing the solver. Next, the analysis process is described in detail with reference to FIGS. 18 through 20.

Firstly, in step S11, the input data D2 designated by a user is read from the external storage device 115, or through the medium driving device 116 or network connection device 117. By that, data, such as the number of time steps nt indicating the time zone (analysis time) of an electric/magnetic field analysis, a time step $\Delta t$, being its step width, the total number of cells nc (=total number of cells disposed on the x-axis ni×total number of cells disposed on the y-axis nj×total number of cells disposed on the z-axis nk), the number of magnetic fields to be corrected nbH (=total of i1–6), the electric characteristic of each material existing in an analysis space (, such as relative permittivity, permittivity σ, etc.), a structural characteristic, such as the size of a cell varying depending on its position, information about an analysis space, absorption boundary conditions specified by the boundary surface (absorption surface) outside the analysis space, an output setting, being a setting used to output a desired analysis result, a wave source and the like are obtained together.

In step S12, generation approximation result data for electric field intensity E correction is generated referring to the approximation result data and the number of electric fields to be corrected is calculated and determined, based on the generated generation approximation result data. In step S13, a variety of coefficients including the k1 through k3 calculated and determined, and in step S14, 0 is assigned to each of an integer variable m and a real number variable t. Then, the process proceeds to step S15.

In step S15, a value obtained by multiplying variable m by the time step Δt is assigned to variable t. In step S16, 1 is assigned to each of integer variable i, j and k. In step S17, electric field intensity E(i.j,k) in a position designated by each of variables i, j and k is calculated by the conventional method. Then, in step S18, the value of variable i is incremented. Then, the process proceeds to step S19.

In step S19, it is determined whether the value of variable i is larger than the total number of cells ni. If the value is larger than the total number of cells ni, the determination becomes yes, and the process proceeds to step S19a. If not, the determination becomes no, and the process returns to step s17. Thus, the process loop formed by steps S17 through S19 is repeatedly performed until all segments of electric field intensity E to be calculated on a line along the x-axis designated by each value of variables j and k are calculated.

In step S19a, 1 is assigned to variable i. In step S20, the value of variable j is incremented. Then, in step S21, it is determined whether the value of variable j is larger than the total number of cells nj. If the value is larger than the total number of cells nj, the determination becomes yes, and the process proceeds to step S21a. If not, the determination becomes no, and the process returns to step S17. Thus, a target line along the x-axis is shifted to another line immediately above it on the y-axis, and all segments of electric field intensity E to be calculated on the line are calculated.

In step S21a, 1 is assigned to each of variables i and j. In step S22, the value of variable k is incremented. Then, in step S23, it is determined whether the value of variable k is larger than the total number of cells nk. If the value is larger than the total number of cells nk, the determination becomes yes, and the process proceeds to step S24 shown in FIG. 19. If not, the determination becomes no, and the process returns to step S17. Thus, a target line along the x-axis is shifted to another line on the XY plane located immediately above it on the z-axis.

The determination of yes in step S23 means that all the calculations of electric field intensity E by the conventional method are completed. Therefore, in steps S24 through S27 shown in FIG. 19 to which the process proceeds by the determination of yes, a process for correcting electric field intensity E to be corrected by the new method is performed.

In step S24, 1 is assigned to integer variable l. The variable l is used to manage the part to be referred of the generation approximation result data generated in step S12. The part corresponds to the part encircled by a broken line in the approximation result data shown in FIG. 14.

The data of the part encircled by a broken line is sequentially added to the approximation result data by the so many numbers of i from the direction of i1. Thus, how to correct is specified by both the data contents (coordinates of electric field intensity E to be corrected, types of two materials touching each other, position of a boundary) of the part, and the position of the data (how to cross a boundary). The data of the part is hereinafter called "correction data" for convenience' sake.

In step S25, electric field intensity E to be corrected is specified by referring to correction data designated by the value of variable l, and is corrected by re-calculating it by a calculation method specified by the position. After the correction, in step S26, the value of variable i is incremented, and the process proceeds to step S27. In step S27, it is determined whether the value of variable l is larger than the number of electric fields nbE calculated in step S12. If the value is larger than the number of electric fields nbE, the determination becomes yes, and the process proceeds to step S28. If not, the determination becomes no, and the process returns to step S25. Thus, electric field intensity E is corrected for the so many number of electric fields nbE.

In step S28, the boundary is calculated according to conditions specified by the absorption boundary of an analysis space. In steps S29 through S36, as in steps S17 through S23, all segments of magnetic field intensity H are calculated by the conventional method. After all the segments of magnetic field intensity H are calculated, the determination in step S36 becomes yes, and the process proceeds to step S37 shown in FIG. 20.

In steps S37 through S40, magnetic field intensity H to be corrected is corrected by the new method referring to the approximation result data obtained in step S11, as in steps S24 through S27. After all segments of magnetic field intensity H to be corrected are corrected, the determination in step S40 becomes yes, and the process proceeds to step S41.

In step S41, an electric field (input wave) in the position is calculated using data for a source wave obtained in step S11. In step S42, according to an output setting, the analysis result is extracted and stored. Then, in step S43, the value of variable m is incremented, and the process proceeds to step S44. In step S44, it is determined whether the value of variable m is larger than the number of time steps nt. If the value is equal to or less than the number of time steps nt, the determination becomes no, and the process returns to step S15 shown in FIG. 18. Thus, a subsequent time step is analyzed. If not, the determination becomes yes, the analysis result stored in step S42 is stored in a storage place specified by a user, by transmitting the analysis result to the external storage device 115, medium driving device 116 or network connection device 117 in a file format, as analysis data D3. In step S45, a message for notifying the user of the analysis time corresponding to the value of variable m and that the analysis has been completed is outputted from the output device 114. Then, a series of the processes terminates.

Next, the electric/magnetic field analysis conducted using the electric/magnetic field analysis device of this preferred embodiment is described in detail.

FIGS. 21A through C show an analysis space to which an electric/magnetic field analysis is applied. FIGS. 21A, B and C show its perspective illustration, section view and top view, respectively.

The analysis space is a substrate whose length in the xy-axis direction and length in the z-axis direction are 4 mm and 0.1 mm, respectively. The wiring pattern 211 is disposed in such a way that its longitudinal side may intersect with the xy-axis, as shown in FIGS. 21A and C. Its position on the z-axis is the center of the substrate, as shown in FIG. 21B. The top/bottom surfaces are covered with a conductor (metal) 212. Each of the conductor 212 and wiring pattern 211 is represented by a surface. The section view shown in FIG. 22B shows the section of, for example, the wiring pattern 211 that is cut by a surface on which its longitudinal side intersects with the xy-axis in the vicinity of its port 211a, being the end of the wiring pattern 211. For a source wave inputted to the port 211a, a modulated Gaussian pulse calculated according to the following equation is used.

$$V = V_0 \cdot \exp[-(t-t_0)^2/t_w^2] \sin[2\pi t/t_p],$$

where the specific values of $t_0$, $t_w$ and $t_p$ are 100, 20 and 100 ps, respectively.

Figure 22A:
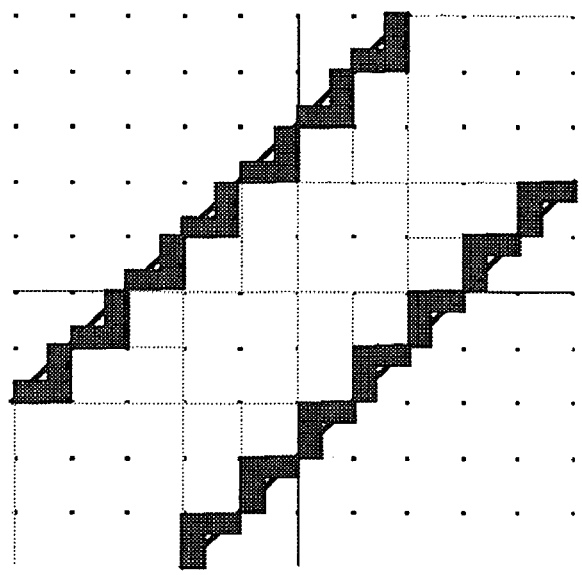
FIG. 22A shows the boundary of a wiring pattern approximated by the preferred embodiment.
Figure 22B:
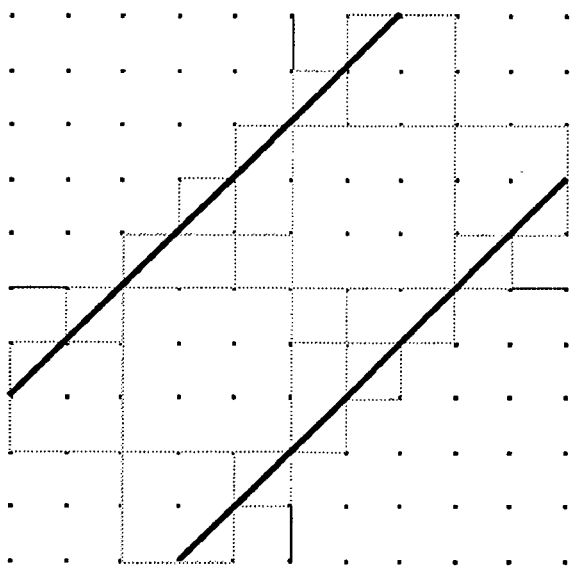
FIG. 22B shows the boundary of a wiring pattern approximated by the conventional method.

FIGS. 22A and B show the approximated boundary of a wiring pattern. FIGS. 22A and B show a boundary approximated by the new method and one approximated by the conventional method, respectively. Each of their real boundaries is indicated by a solid line. In FIG. 22A, a cell in which the approximated boundary obtained by the new method is different from one calculated by the conventional method paints over a part in which the wiring pattern exists.

As clear from FIGS. 22A and B, according to the new method, a boundary is more accurately approximated, compared with the conventional method.

FIG. 23 shows the accuracy of an electric/magnetic field analysis by the new method. The accuracy of an electric/magnetic field analysis by the conventional method is also shown for the purpose of comparison.

As shown in FIGS. 22A and B, analysis accuracy is greatly improved, compared with the conventional method by more accurately expressing a boundary even if the same cell size is used in electric/magnetic field analysis (error is improved from 4.2% to 2.5%). Because of such an improvement, calculation time can be suppressed to ¼ to ⅕ in order to conduct an analysis with the same accuracy.

As shown in FIGS. 3A through C, if a boundary intersects with two centerlines, a new boundary is expressed using an orthogonal line obtained for each centerline. However, even if a boundary intersects with two centerlines, one of the two orthogonal lines itself can also be used as a new boundary. Thus, according to the new method, a boundary can be more accurately expressed, compared with the conventional method. For the calculation of both electric field intensity E and magnetic field intensity H that should be corrected, a different calculation method from that of this preferred embodiment can also be used.

What is claimed is:

1. A method for conducting an electric/magnetic field analysis using a finite different time domain method dividing an analysis space by a polyhedron cell and differentiating a spatial domain, comprising:
    setting a boundary between materials in the analysis space;
    specifying a surface on which the boundary exists, out of surfaces constituting a cell used to divide the analysis space; and
    approximating a boundary existing on the specified surface according to at least one predetermined pattern with the boundary that exists on the surface being approximated according to the pattern obtained by calculating an intersection between a centerline which goes through a center of the surface and is parallel to one of the coordinate axes and the boundary, and designating a line which goes through the intersection and is orthogonal to the centerline as a new boundary; and
    conducting an electric/magnetic field analysis calculating both the electric field intensity and magnetic field intensity of the surface.

2. The electric/magnetic field analysis using a finite difference time domain method according to claim 1, wherein
    said intersections are obtained by crossing two centerlines parallel to each different coordinate axis and a boundary, and if two intersections in total, one for each centerline, are obtained, said new boundary is expressed using two orthogonal lines in total, one for each centerline.

3. The electric/magnetic field analysis using a finite difference time domain method according to claim 1, wherein
    said new boundary that exists on the surface and is approximated according to the pattern is obtained by obtaining an intersection between a centerline which goes through the center of the cell that has the surface and is parallel to one of the coordinate axes and the boundary, and designating a line obtained by crossing a surface which goes through the intersection and is orthogonal to the centerline and the surface as a new boundary.

4. The electric/magnetic field analysis using a finite difference time domain method according to claim 1, wherein
    if one of the two materials touching each other on a boundary existing on the surface is a conductor and the other is a dielectric, electric field intensity to be calculated of the dielectric on the surface is calculated using a plurality of magnetic field intensities of the dielectric, calculated in the vicinity of the surface, and magnetic field intensity to be calculated of the dielectric on the surface is calculated using both other electric field intensities of the dielectric, calculated in the vicinity of the surface, and the electric field intensity of the boundary.

5. The electric/magnetic field analysis using a finite difference time domain method according to claim 1, wherein
    if two materials touching each other on a boundary existing on the surface are both dielectrics, the electric/magnetic field intensity on the surface is calculated using electric/magnetic field intensities to be calculated in one of the two dielectrics.

6. The electric/magnetic field analysis using a finite difference time domain method according to claim 1, wherein
    after calculating all electric field intensity and magnetic field intensity assuming that the boundary exists along the side of the surface, at least one of electric field intensity and magnetic field intensity which are calculated on a surface where the boundary exists is corrected.

7. A method for expressing a material in an electric/magnetic field analysis using a finite difference time domain method dividing an analysis space by a polyhedron cell and differentiating a spatial domain, comprising:
    setting a boundary between materials existing in the analysis space;
    specifying a surface on which the boundary exists out of surfaces constituting a cell used to divide the analysis space; and
    approximating a boundary existing on the specified surface according to at least one predetermined pattern according to the pattern obtained by calculating an intersection between a centerline which goes through a center of the surface and is parallel to one of the coordinate axes and the boundary, and designating a line which goes through the intersection and is orthogonal to the centerline as a new boundary.

8. An electric/magnetic field analysis device conducting an electric/magnetic field analysis using a finite difference time domain method dividing an analysis space by a polyhedron cell and differentiating a spatial domain, comprising:
    a surface specification unit specifying a surface on which a boundary between materials out of surfaces constituting a cell used to divide the analysis space; and
    an electric/magnetic field analysis unit approximating a boundary existing on the surface specified by the surface specification unit according to at least one predetermined pattern according to the pattern obtained by calculating an intersection between a centerline which goes through a center of the surface and is parallel to one of the coordinate axes and the boundary, and designating a line which goes through the intersection and is orthogonal to the centerline as a new boundary, and calculating both electric field intensity and magnetic field intensity by the electric/magnetic analysis.

9. A device for generating analysis data used to conduct an electric/magnetic field analysis using a finite difference time domain method dividing an analysis space by a polyhedron cell and differentiating a spatial domain, comprising:

a data acquisition unit obtaining both the analysis space and analysis target data in which a boundary is defined between materials existing in the analysis space;

a surface specification unit analyzing the analysis target data obtained by the data acquisition unit and specifying a surface on which the boundary exists out of surfaces constituting a cell used to divide the analysis space;

a boundary approximation unit approximating a boundary existing on the surface specified by the surface specification unit according to at least one pattern; and a data generation unit generating data indicating the approximation result of the boundary obtained by the boundary approximation unit as the analysis data.

10. An electric/magnetic field analysis device for conducting an electric/magnetic field analysis using a finite difference time domain method dividing an analysis space by a polyhedron cell and differentiating a spatial domain, comprising:

a data acquisition unit obtaining both the analysis space and analysis target data in which a boundary is defined between materials existing in the analysis space; and an electric/magnetic field analysis unit approximating a boundary existing on the surface according to the pattern, based on the data obtained by the data acquisition unit.

11. A computer-readable storage medium on which is recorded a program for enabling a computer to conduct an electric/magnetic field analysis using a finite difference time domain method dividing an analysis space by a polyhedron cell and differentiating a spatial domain, comprising:

specifying a surface on which a boundary exists between materials out of surfaces constituting a cell used to divide the analysis space; and approximating a boundary existing on the surface specified by the specification function according to at least one predetermined pattern according to the pattern is obtained by calculating an intersection between a centerline which goes through a center of the surface and is parallel to one of the coordinate axes and the boundary, and designating a line which goes through the intersection and is orthogonal to the centerline as a new boundary, and calculating both electric field intensity and magnetic field intensity by the electric/magnetic field analysis.

12. A computer-readable storage medium on which is recorded a program for enabling a computer to conduct an electric/magnetic field analysis using a finite difference time domain method dividing an analysis space by a polyhedron cell and differentiating a spatial domain, comprising:

obtaining both the analysis space and analysis target data in which a boundary is defined between materials existing in the analysis space;

analyzing the analysis target data obtained by the acquisition function and specifying a surface on which the boundary exists out of surfaces constituting a cell used to divide the analysis space;

approximating a boundary existing on the surface specified by the specification function according to at least one predetermined pattern according to the pattern is obtained by calculating an intersection between a centerline which goes through a center of the surface and is parallel to one of the coordinate axes and the boundary, and designating a line which goes through the intersection and is orthogonal to the centerline as a new boundary; and generating data indicating the approximation result of the boundary obtained by the approximation function.

13. A computer-readable storage medium on which is recorded a program for enabling a computer to conduct an electric/magnetic field analysis using a finite difference time domain method dividing an analysis space by a polyhedron cell and differentiating a spatial domain, comprising:

obtaining both the analysis space and analysis target data in which a boundary is defined between media existing in the analysis space; and approximating a boundary existing on the surface according to the pattern, based on the data obtained the acquisition function, and calculating both electric field intensity and magnetic field intensity by the electric/magnetic field analysis.

* * * * *

UNITED STATES PATENT AND TRADEMARK OFFICE
CERTIFICATE OF CORRECTION

PATENT NO.         : 7,089,130 B2                                       Page 1 of 1
APPLICATION NO. : 10/923709
DATED              : August 8, 2006
INVENTOR(S)        : Takashi Yamagajo et al.

It is certified that error appears in the above-identified patent and that said Letters Patent is hereby corrected as shown below:

Column 20, Line 42, after "obtained" insert --by--.

Signed and Sealed this

Second Day of January, 2007

JON W. DUDAS
*Director of the United States Patent and Trademark Office*